United States Patent
Giannakis et al.

(10) Patent No.: US 7,430,243 B2
(45) Date of Patent: Sep. 30, 2008

(54) SPACE-TIME-FREQUENCY CODED OFDM COMMUNICATIONS OVER FREQUENCY-SELECTIVE FADING CHANNELS

(75) Inventors: Georgios B. Giannakis, Minnetonka, MN (US); Zhiqiang Liu, Iowa City, IA (US); Yan Xin, Singapore (SG)

(73) Assignees: Regents of the University of Minnesota, St. Paul, MN (US); Electronics and Telecommunications Research Institute (KR)

( * ) Notice: Subject to any disclaimer, the term of this patent is extended or adjusted under 35 U.S.C. 154(b) by 919 days.

(21) Appl. No.: 10/828,104

(22) Filed: Apr. 20, 2004

(65) Prior Publication Data

US 2005/0002325 A1 Jan. 6, 2005

Related U.S. Application Data

(60) Provisional application No. 60/464,307, filed on Apr. 21, 2003.

(51) Int. Cl.
*H04L 1/02* (2006.01)
(52) U.S. Cl. .................. 375/267; 375/146; 375/299; 370/208; 370/437; 370/465
(58) Field of Classification Search .............. 375/146, 375/260, 267, 295, 299; 370/208, 328, 329, 370/330, 437, 464, 465; 455/101, 103
See application file for complete search history.

(56) References Cited

U.S. PATENT DOCUMENTS

| | | | |
|---|---|---|---|
| 6,088,408 A | 7/2000 | Calderbank et al. | |
| 6,188,717 B1 | 2/2001 | Kaiser et al. | |
| 7,298,787 B2 * | 11/2007 | Priotti | ................ 375/267 |
| 2002/0122502 A1 | 9/2002 | El-Gamal et al. | |
| 2002/0126740 A1 | 9/2002 | Giannakis et al. | |
| 2002/0136327 A1 | 9/2002 | El-Gamal et al. | |
| 2002/0146078 A1 | 10/2002 | Gorokhov et al. | |
| 2003/0169824 A1 | 9/2003 | Chayat | |
| 2004/0037214 A1 | 2/2004 | Blasco Claret et al. | |
| 2005/0058217 A1 | 3/2005 | Sandhu et al. | |

OTHER PUBLICATIONS

Zhang et al. (US 2006/0093057); May 4, 2006; System And Method For Space-Time-Frequency Coding In A Multi-Antenna Transmission System.*

(Continued)

*Primary Examiner*—Dac V Ha
(74) *Attorney, Agent, or Firm*—Shumaker & Sieffert, P.A.

(57) ABSTRACT

Techniques are described for space-time-frequency (STF) coding of multi-carrier transmissions over frequency-selective fading channels. In particular, techniques for STF coding of MIMO-OFDM systems are described that provide maximum diversity, high coding gains, and low decoding complexity are described. A set of generally correlated OFDM subcarriers are divided into groups of subcarriers creating a set of group STF (GSTF) subsystems, within which STF coding is applied to each GSTF subsystem. Subcarrier grouping preserves maximum diversity gains and simplifies both the code construction within each GSTF and decoding complexity. ST coding techniques are used in designing STF block (STFB) and STF trellis (STFT) codes which are applied within GSTF subsystems.

27 Claims, 8 Drawing Sheets

OTHER PUBLICATIONS

Shattil (US 2007/0211786); Sep. 13, 2007; MultiCarrier Sub-Layer For Direct Sequence Channel And Multiple-Access Coding.*

Dubuc et al (US 2004/0190640); Sep. 30, 2004; Sub-Carrier Allocation For OFDM.*

B.M. Hochwald et al., "Achieving Near-Capacity on a Multiple-Antenna Channel," IEEE Transactions on Communication, vol. 51, No. 3, pp. 389-399, Mar. 2003.

G.J. Saulnier et al, "Performance of an OFDM Spread Spectrum Communications system Using Lapped Transforms," in Proc. MILCOM Conf., vol. 2, 1997, pp. 608-612.

G.J. Saulnier et al., "Performance of a Spread Spectrum OFDM System in a Dispersive Fading Channel with Interference," in Proc. MILCOM Conf., vol. 2, 1998, pp. 679-683.

I. Koffman et al., "Broadband Wireless Access Solutions Based on OFDM Access in IEEE 802.16," IEEE Communications Magazine, vol. 40, No. 4, pp. 96-103, Apr. 2002.

L. Wei et al., "Space-Time-Frequency Block Coding Over Rayleigh Fading Channels For OFDM Systems," Proceedings of the International Conference on Communication Technology, ICCT 2003, vol. 2, pp. 1008-1012, Apr. 2003.

L. Wei et al., "Synchronization Requirements for Multi-user OFDM on Satellite Mobile and Two-Path Rayleigh Fading Channels," IEEE Transactions on Communications, vol. 43, No. 2/3/4, pp. 887-895, Feb.-Apr. 1995.

N. Yee et al., "BER of Multi-Carrier CDMA in an Indoor Rician Fading Channel," Conference Record of the Twenty-Seventh Asilomar Conference on Signals, Systems and Computers, pp. 426-430, 1993.

P. Xia et al., "Bandwidth-and Power-Efficient Multicarrier Multiple Access," IEEE Transactions On Communications, vol. 51, No. 11, pp. 1828-1837, Nov. 2003.

S. Kaiser et al., "A Flexible Spread-Spectrum Multi-Carrier Multiple-Access System for Multi-Media Applications," in Procedures of $8^{th}$ IEEE International Symposium PIMRC, vol. 1, 1997, pp. 100-104.

S. Zhou et al, "Frequency-Hopped Generalized MC-CDMA for Multipath and Interference Suppression," in Proc. MILCOM Conf., vol. 2, Los Angeles, CA Oct. 22-25, 2000, pp. 937-941.

W.Y. Zou et al., "COFDM: An Overview," IEEE Transactions on Broadcasting, vol. 41, No. 1, pp. 1-8, Mar. 1995.

Y. Xin et al., "Space-Time Constellation-Rotating Codes Maximizing Diversity and Coding Gains," in Procedures of Global Telecommunications Conference, Nov. 2001, pp. 455-459.

Z. Wang et al., "Complex-Field Coding for OFDM Over Fading Wireless Channels," IEEE Transactions on Information Theory, vol. 49, No. 3, pp. 707-720, Mar. 2003.

Z. Wang et al., "Joint Coding-Precoding with Low-Complexity Turbo Decoding," IEEE Transactions on Wireless Communications, vol. XXX, No. XXX, pp. 1-11, 2003.

Office Action from related Canadian case, Application No. 2,427,403, mailed Jan. 10, 2007, 2 pages.

Zhengdao Wang et al., "Linearly Precoded or Coded OFDM Against Wireless Channel Fades?," Third IEEE Signal Processing Workshop on Signal Processing Advances in Wireless Communications, Taoyuan, Taiwan, pp. 267-270, Mar. 20-23, 2001.

Srihari Adireddy et al., "Optimal Embedding of Known Symbols for OFDM," in Procedures International Conference, ASSP, vol. 4, Salt Lake City, UT, May 2001.

Yan Xin et al., "Space-Time Diversity Systems Based on Linear Constellation Precoding," IEEE Transactions On Wireless Communications, vol. 2, No. 2, pp. 294-309, Mar. 2003.

Yan Xin et al., "Space-Time Diversity Systems Based on Unitary Constellation-Rotating Precoders," in Procedures International Conference, Speech, Signal Process., Salt Lake City, UT, pp. 2429-2432, May 7-11, 2001.

Alexandra Duel-Hallen et al., "Long-Range Predication of Fading Channels," IEEE Signal Processing Magazine, pp. 62-75, May 2000.

Anastasios Stamoulis et al., "Block FIR Decision-Feedback Equalizers for Filterbank Precoded Transmissions with Blind Channel Estimation Capabilities," IEEE Transactions on Communications, vol. 49, No. 1, pp. 69-83, Jan. 2001.

Anders Furuskar et al., "EDGE: Enhanced Data Rates for GSM and TDMA/136 Evolution," IEEE Personal Communications, vol. 6, No. 3, pp. 56-66. Jun. 1999.

Amos Lapidoth et al., "Fading Channels: How Perfect Need "Perfect Side Information" be?," in Procedures IEEE Information Theory Communications Workshop, pp. 36-38, Jun. 1999.

Ayman F. Naguib et al., "Increasing Data Rate Over Wireless Channels," IEEE Signal Processing Magazine, vol. 17, pp. 76-92, May 2000.

Akbar M. Sayeed et al., "Joint Multipath-Doppler Diversity in Mobile Wireless Communications," IEEE Transactions On Communications, vol. 47, No. 1, pp. 123-132, Jan. 1999.

A.P. Clark et al., "Adaptive Channel Estimator for an HF Radio Link," IEEE Transactions On Communications, vol. 37, No. 9, pp. 918-926, Sep. 1989.

Anna Scaglione et al., "Filterbank Transceivers Optimizing Information Rate in block Transmissions Over Dispersive Channels," IEEE Transactions on Information Theory, vol. 45, No. 3, pp. 1019-1032, Apr. 1999.

Anna Scaglione et al., "Redundant Filterbank Precoders and Equalizers Part I: Unification and Optimal Designs," IEEE Transactions on Signal Processing, vol. 47, No. 7, pp. 1988-2022, Jul. 1999.

Anna Scaglione et al., "Redundant Filterbank Precoders and Equalizers Part II: Blind Channel Estimation, Synchronization, and Direct Equalization," IEEE Transactions on Signal Processing, vol. 47, No. 7, pp. 2007-2022, Jul. 1999.

B. Muquet et al., "Reduced Complexity Equalizers For Zero-Padded OFDM Transmissions," Procedures of International Conference on ASSP, vol. 5, pp. 2973-2976, Jun. 2000.

Babak Hassibi et al., "How Much Training Is Needed in Multiple-Antenna Wireless Links?" IEEE Transactions On Information Theory, vol. 49, No. 4, pp. 951-963, Apr. 2003.

Ben Lu et al., "Space-Time Code Design in OFDM Systems," in Procedures Global Telecommunications Conference, vol. 2, San Francisco, CA, pp. 1000-1004, Nov. 27-Dec. 1, 2000.

Cristian Budianu et al., "Channel Estimation for Space-Time Orthogonal Block Codes," IEEE Transactions on Signal Processing, vol. 50, No. 10, pp. 2515-2528, Oct. 2002.

C. Fragouli et al., "Finite-Alphabet Constant-Amplitude Training Sequence for Multiple-Antenna Broadband Transmissions," Procedures of IEEE International Conference on Communications, vol. 1, pp. 6-10, NY City, Apr. 28-May 1, 2002.

C. Fragouli et al., "Reduced-Complexity Training Schemes for Multiple-Antenna Broadband Transmissions," Procedure of Wireless Communications and Networking Conference, vol. 1, pp. 78-83, Mar. 17-21, 2002.

Cihan Tepedelenlioglu et al., "Transmitter Redundancy for Blind Estimation and Equalization of Time-and Frequency-Selective Channels," IEEE Transactions On Signal Processing, vol. 48, No. 7, pp. 2029-2043, Jul. 2000.

Dakshi Agrawal et al., "Space-Time Coded OFDM High Data-Rate Wireless Communication Over Wideband Channels," in Procedures on Vehicles Technology Conference, Ottawa, ON, Canada, pp. 2232-2236, May 18-21, 1998.

Deva K. Borah et al., "Frequency-Selective Fading Channel Estimation with a Polynomial Time-Varying Channel Model," IEEE Transactions On Communications, vol. 47, No. 6, pp. 862-873, Jun. 1999.

Dennis L. Goeckel, "Coded Modulation With Non-Standard Signal Sets for Wireless OFDM Systems," in Procedures International Conference Communications, Vancouver, BC, Canada, pp. 791-795, Jun. 1999.

Ezio Biglieri et al., "Fading Channels: Information-Theoretic and Communications Aspects," IEEE Transactions on Information Theory, vol. 44, No. 6, pp. 2619-2692, Oct. 1998.

Emanuele Viterbo et al., "A Universal Lattice Code Decoder for Fading Channels," IEEE Transactions on Information Theory, vol. 45, No. 5, pp. 1639-1642, Jul. 1999.

E. Lindskog et al, "A Transmit Diversity Scheme for Channels With Intersymbol Interference," Procedures of ICC, vol. 1, pp. 307-311, Jun. 2000.

Frederick W. Vook et al., "Transmit Diversity Schemes for Broadband Mobile Communication Systems," Procedures of IEEE VTC, vol. 6, pp. 2523-2529, 2000.

Fredrik Tufvesson et al., "OFDM Time and Frequency Synchronization by Spread Spectrum Pilot Technique," in Procedures 8th Communication Theory Mini-Conference, Vancouver, BC, Canada, pp. 1-5, Jun. 1999.

Georgios B. Giannakis, "Cyclostationary Signal Analysis," The Digital Signal Processing Handbook, V.K. Madisetti and D. Williams, Eds. Boca Raton, FL: CRC, Chapter 17, 1998.

Georgios B. Giannakis et al., "Basis Expansion Models and Diversity Techniques for Blind Identification and Equalization of Time-Varying Channels," Proceedings of the IEEE, vol. 86, No. 10, pp. 1969-1986, Oct. 1998.

Georgios B. Giannakis, "Filterbanks for Blind Channel Identification and Equalization," IEEE Signal Processing Letters, vol. 4, No. 6, pp. 184-187, Jun. 1997.

Gerard J. Foschini, "Layered Space-Time Architecture for Wireless Communications in a Fading Environment When Using Multi-Element Antennas," Bell Labs Technical Journal, vol. 1, No. 2, pp. 41-59, 1996.

Ghassan Kawas Kaleh, "Channel Equalization for Block Transmission Systems," IEEE Journal on Selected Areas In Communications, vol. 13, No. 1, pp. 110-121, Jan. 1995.

H. Vincent Poor, "Probability of Error in MMSE Multiuser Detection," IEEE Transaction on Information Theory, vol. 43, No. 3, pp. 858-871, May 1997.

Helmut Bolcskei et al., "Blind Channel Identification and Equalization in OFDM-Based Multiantenna Systems," IEEE Transactions on Signal Processing, vol. 50, No. 1, pp. 96-109, Jan. 2002.

Helmut Bolcskei et al., "Space-Frequency Coded Broadband OFDM Systems," Invited paper, presented at IEEE WCNC 2000, Chicago, pp. 1-6, September 2000.

Helmut Bolcskei et al., "Space-Frequency Codes for Broadband Fading Channels," in International Symposium Information Theory, Washington, DC, 1 page, Jun. 2001.

Hui Liu et al., "A High-Efficiency Carrier Estimator For OFDM Communications," IEEE Communications Letters, vol. 2, No. 4, pp. 104-106, Apr. 1998.

Hikmet Sari et al., "Transmission Techniques for Digital Terrestrial TV Broadcasting," IEEE Communications Magazine, vol. 33, pp. 100-103, Feb. 1995.

H. Vikalo et al., "Optimal Training for Frequency-Selective Fading Channels," Procedures of International Conference on ASSP, Salt Lake City, Utah, vol. 4, pp. 2105-2108, May 7-11, 2001.

I. Barhumi et al., "Optimal Training Sequences for Channel Estimation in MIMO OFDM Systems in Mobile Wireless Communications," Procedures of International Zurich Seminar on Access, Transmission, Networking of Broadband Communications, 6 pgs., ETH Zurich, Switzerland, Feb. 19-21, 2002.

I.Emre Telatar, "Capacity of Multiple-Antenna Gaussian Channels," European Transactions Telecommunications, vol. 10, pp. 1-28, Nov.-Dec. 1998.

Jens Baltersee et al., "Achievable Rate of MIMO Channels With Data-Aided Channel Estimation and Perfect interleaving," IEEE Journal on Selected Areas In Communication, vol. 19, No. 12, 2358-2368, Dec. 2001.

J. Boutros et al., "Signal Space Diversity: A Power And Bandwidth Efficient Diversity Technique for the Rayleigh Fading Channel," IEEE Transactions Information Theory, vol. 44, pp. 1-34, Jul. 1998.

Jerome A. Gansman et al., "Optimum and Suboptimum Frame Synchronization for Pilot-Symbol-Assisted Modulation," IEEE Transactions on Communications, vol. 45, No. 10, pp. 1327-1337, Oct. 1997.

Jiann-Cing Guey et al., "Signal Design for Transmitter Diversity Wireless Communication Systems Over Rayleigh Fading Channels," IEEE Transactions on Communications, vol. 47, No. 4, pp. 527-537, Apr. 1999.

Jonathan H. Manton et al., "Affine Precoders for Reliable Communications," in Procedures International Conference ASSP, vol. 5, Istanbul, Turkey, pp. 2749-2752, Jun. 2000.

James K. Cavers, "Pilot Symbol Assisted Modulation and Differential Detection in Fading and Delay Spread," IEEE Transactions On Communications, vol. 43, No. 7, pp. 2206-2212, Jul. 1995.

James K. Cavers, "An Analysis of Pilot Symbol Assisted Modulation for Rayleigh Fading Channels," IEEE Transactions On Vehicular Technology, vol. 40, No. 4, pp. 686-693, Nov. 1991.

John A.C. Bingham, "Multicarrier Modulation for Data Transmission: An Idea Whose Time Has Come," IEEE Communications Magazine, pp. 5-14, May 1990.

Jitendra K. Tugnait et al., "Second-Order Statistics-Based Blind Equalization of IIR Single-Input Multiple-Output Channels with Common Zeros," IEEE Transactions On Signal Processing, vol. 47, No. 1, pp. 147-157, Jan. 1999.

Linda M. Davis et al., "Joint MAP Equalization and Channel Estimation for Frequency-Selective and Frequency-Flat Fast-Fading Channels," IEEE Transactions On communications, vol. 49, No. 12, pp. 2106-2114, Dec. 2001.

Lizhong Zheng et al., "Communication on the Grassmann Manifold: A Geometric Approach to the Noncoherent Multiple-Antenna Channel," IEEE Transactions On Information Theory, vol. 48, No. 2, pp. 359-383, Feb. 2002.

Min Dong et al., "Optimal Design and Placement of Pilot Symbols for Channel Estimation," IEEE Transactions On Signal Processing, vol. 50, No. 12, pp. 3055-3069, Dec. 2002.

Massimiliano (Max) Martone, "Wavelet-Based Separating Kernels for Sequence Estimation with Unknown Rapidly Time-Varying Channels," IEEE Communications Letter, vol. 3, No. 3, pp. 78-80, Mar. 1999.

Muriel Medard, "The Effect Upon Channel Capacity in Wireless Communications of Perfect and Imperfect Knowledge of the Channel," IEEE Transactions on Information Theory, vol. 46, No. 3, pp. 933-946, May 2000.

Michele Morelli et al., "Carrier-Frequency Estimation for Transmissions Over Selective Channels," IEEE Transactions On Communications, vol. 48, No. 9, pp. 1580-1589, Sep. 2000.

Magnus Sandell et al., "A Comparative Study of Pilot-Based Channel Estimators for Wireless OFDM," pp. 5-34, Sep. 1996.

Martin V. Clark, "Adaptive Frequency-Domain Equalization and Diversity Combining for Broadband Wireless Communications," IEEE Journal on Selected Areas in Communications, vol. 16, No. 8, pp. 1385-1395, Oct. 1998.

Michail K. Tsatsanis et al., "Equalization of Rapidly Fading Channels: Self-Recovering Methods," IEEE Transactions on Communications, vol. 44, No. 5, pp. 619-630, May 1996.

Michail K. Tsatsanis et al., "Modelling and Equalization of Rapidly Fading Channels,"International Journal of Adaptive Control and Signal Processing, vol. 10, pp. 159-176, May 1996.

Michail K. Tsatsanis et al., "Pilot Symbol Assisted Modulation in Frequency Selective Fading Wireless Channels," IEEE Transactions On Signal Processing, vol. 48, No. 8, pp. 2353-2365, Aug. 2000.

Naofal Al-Dhahir, "Single-Carrier Frequency-Domain Equalization for Space-Time Block-Coded Transmissions Over Frequency-Selective Fading Channels," IEEE Communications Letters, vol. 5, No. 7, pp. 304-306, Jul. 2001.

Oussama Damen et al., "Lattice Code Decoder for Space-Time Codes," IEEE Communication Letters, vol. 4, No. 5, pp. 161-163, May 2000.

Naofal Al-Dhahir et al., "Block Transmission Over Dispersive Channels: Transmit Filter Optimization and Realization, and MMSE-DFE Receiver Performance," IEEE Transactions Information Theory, vol. 42, No. 1, pp. 137-160, Jan. 1996.

Peter Hoeher et al., "Channel Estimation with Superimposed Pilot Sequence," in Procedure GLOBECOM Conference, Brazil, pp. 1-5, Dec. 1999.

Peter Hoeher et al., "Two-Dimensional Pilot-Symbol-Aided Channel Estimation by Wiener Filtering," Procedures of International Conference on Acoustics, Speech and Signal Processing, Munich, Germany, vol. 3, pp. 1845-1848, Apr. 1997.

Paul H. Moose, "A Technique for Orthogonal Frequency Division Multiplexing Frequency Offset Correction," IEEE Transactions On Communications, vol. 42, No. 10, pp. 2908-1314, Oct. 1994.

Peter Schramm, "Analysis and Optimization of Pilot-Channel-Assisted BPSK for DS-CDMA Systems," IEEE Transactions Communications, vol. 46, No. 9, pp. 1122-1124, Sep. 1998.

Peter Schramm et al., "Pilot Symbol Assisted BPSK on Rayleigh Fading Channels with Diversity: Performance Analysis and Parameter Optimization," IEEE Transactions on Communications, vol. 46, No. 12, pp. 1560-1563, Dec. 1998.

Qinfang Sun et al., "Estimation of Continuous Flat Fading MIMO Channel," IEEE Transactions On Wireless Communications, vol. 1, No. 4, pp. 549-553, Oct. 2002.

Rohit Negi et al., "Pilot Tone Selection for Channel Estimation in a Mobile OFDM System," IEEE Transactions On Consumer Electronics, vol. 44, No. 3, pp. 1122-1128, Aug. 1998.

Robert Molten Gray, "On the Asymptotic Eigenvalue Distribution of Toeplitz Matrices," IEEE Transactions On Information Theory, vol. IT-18, No. 6, pp. 725-730, Nov. 1972.

Srihari Adireddy et al, "Optimal Placement of Training for Frequency-Selective Block-Fading Channels," IEEE Transactions On Information Theory, vol. 48, No. 8, pp. 2338-2353, Aug. 2002.

Srihari Adireddy et al., "Detection With Embedded Known Symbols: Optimal Symbol Placement and Equalization," In Procedures of International Conference ASSP, vol. 5, Istanbul, Turkey, pp. 2541-2544, Jun. 2000.

Stephen Baro et al., "Improved Codes for Space-Time Trellis Coded Modulation," IEEE Communication Letters, vol. 4, pp. 1-3, Jan. 2000.

Sergio Benedetto et al., "Principles of Digtal Transmission with Wireless Applications," Kluwer Academic/Plenum Publishers, 1 pg., 1999.

Srikrishna Bhashyam et al., "Time-Selective Signaling and Reception for Communication Over Multipath Fading Channels," IEEE Transactions On Communications, vol. 48, No. 1, pp. 1-34, Jan. 2000.

Stefan A. Fechtel et al., "Optimal Parametric Feedforward Estimation of Frequency-Selective Fading Radio Channels," IEEE Transactions on Communications, vol. 42, No. 2/3/4, pp. 1639-1650, Feb./Mar./Apr., 1994.

S.N. Diggavi et al., "Differential Space-Time Coding for Frequency-Selective Channels," Procedures of 36 th Conference on Information Sciences and Systems, pp. 1-8, Princeton University, NJ, Mar. 20-22, 2002.

Shuichi Ohno et al., "Average-Rate Optimal PSAM Transmissions Over Time-Selective Fading Channels," IEEE Transactions On Wireless Communications, pp. 374-378, Oct. 2002.

Shuichi Ohno et al., "Capacity Maximizing MMSE-Optimal Pilots for Wireless OFDM Over Frequency-Selective Block Rayleigh- Fading Channels," IEEE Transactions On Information Theory, pp. 2138-2145, vol. 50, No. 9, Sep. 2004.

Shuichi Ohno et al., "Optimal Training and Redundant Precoding For Block Transmissions With Application to Wireless OFDM," IEEE Transactions on Communications, vol. 50, No. 12, pp. 2113-2123, Dec. 2002.

Shengli Zhou et al., "Space-Time Coding With Maximum Diversity Gains Over Frequency-Selective Fading Channels," IEEE Signal Processing Letters, vol. 8, No. 10, pp. 269-272, Oct. 2001.

Shengli Zhou et al., "Subspace-Based (Semi-) Blind Channel Estimation for Block Precoded Space-Time OFDM," IEEE Transactions On Signal Processing, vol. 50, No. 5, pp. 1215-1228, May 2002.

Siavash M. Alamouti, "A Simple Transmit Diversity Technique For Wireless Communications," IEEE Journal on Select Areas In Communications, vol. 16, No. 8, pp. 1451-1458, Oct. 1998.

Thomas Kailath, "Measurements on Time-Variant Communication Channels," IEEE Transactions On Information Theory, vol. IT-8, pp. S229-S236, Sep. 1962.

Thomas Keller et al., "Adaptive Multicarrier Modulation: A Convenient Framework for Time-Frequency Processing in Wireless Communications," IEEE Procedings of the IEEE, vol. 88, No. 5, pp. 611-640, May 2000.

Thomas L. Marzetta and Bertrand M. Hochwald, "Capacity of a Mobile Multiple-Antenna Communication Link in Rayleigh Flat Fading," IEEE Transactions on Information Theory, vol. 45, pp. 1-38, Jan. 1999.

Tai-Lai Tung et al., "Channel Estimation and Adaptive Power Allocation for Performance and Capacity Improvement of Multiple-Antenna OFDM Systems," Third IEEE Signal Processing Workshop on Signal Processing Advances in Wireless Communications, Taoyuan, Taiwan, pp. 82-85, Mar. 20-23, 2001.

Thomas P. Holden et al., "A Spread-Spectrum Based Synchronization Technique for Digital Broadcast Systems," IEEE Transactions on Broadcasting, vol. 36, No. 3, pp. 185-194, Sep. 1990.

Ufuk Tureli et al., "OFDM Blind Carrier Offset Estimation: ESPRIT," IEEE Transactions On Communications, vol. 48, No. 9, pp. 1459-1461, Sep. 2000.

Vahid Tarokh et al., "Space-Time Block Codes From Orthogonal Designs," IEEE Transactions on Information Theory, vol. 45, No. 5, pp. 1456-1467, Jul. 1999.

Vahid Tarokh et al., "Space-Time Codes for High Data Rate Wireless Communication: Performance Criterion and Code Construction," IEEE Transaction on Information Theory, vol. 44, No. 2, pp. 744-765, Mar. 1998.

Werner Kozek, "On the Transfer Function Calculus for Underspread LTV Channels," IEEE Transactions On Signal Processing, vol. 45, No. 1, pp. 219-223, Jan. 1997.

Wen-Yi Kuo et al., "Frequency Offset Compensation of Pilot Symbol Assisted Modulation in Frequency Flat Fading," IEEE Transactions on Communications, vol. 45, No. 11, pp. 1412-1416, Nov. 1997.

Won-Joon Choi et al., "Multiple Input/Multiple Output (MIMO) Equalization for Space-Time Block Coding," IEEE Pacific Rim Conference on Communications, Computers and Signal Processing, pp. 341-344, 1999.

Won-Joon Choi et al., "Space-Time Block Codes Over Frequency Selective Rayleigh Fading Channels," IEEE VTC, vol. 5, pp. 2541-2545, 1999.

Xavier Giraud et al., "Algebraic Tools To Build Modulation Schemes for Fading Channels," IEEE Transactions on Information Theory, vol. 43, No. 3, pp. 938-952, May 1997.

Xiaodong Wang et al., "Iterative (Turbo) Soft Interference Cancellation and Decoding for Coded CDMA," IEEE Transactions on Communications, vol. 47, No. 7, pp. 1046-1061, Jul. 1999.

Xiaoli Ma et al., "Maximum Diversity Transmissions Over Doubly Selective Wireless Channels," IEEE Transactions On Information Theory, vol. 49, No. 7, pp. 1832-1840, Jul. 2003.

Xiaoli Ma et al., "Optimal Training for Block Transmissions Over Doubly Selective Wireless Fading Channels," IEEE Transactions on Signal Processing, vol. 51, No. 5, pp. 1351-1366, May 2003.

Xiaoli Ma et al., "Non-Data-Aided Carrier Offset Estimators for OFDM With Null Subcarriers: Identifiability, Algorithms, and Performance," IEEE Journal On Selected Areas In Communications, vol. 19, No. 12, pp. 2504-2515, Dec. 2001.

Xiaoli Ma et al., "Optimal Training for MIMO Frequency-Selective Fading Channels," IEEE Transactions on Wireless Communications, pp. 1-14.

Ye (Geoffrey) Li et al., "Transmitter Diversity for OFDM Systems and Its Impact on High-Rate Data Wireless Networks," IEEE Journal on Selected Areas In Communications, vol. 17, No. 7, pp. 1233-1243, Jul. 1999.

Ye (Geoffrey) Li, "Simplified Channel Estimation for OFDM Systems With Multiple Transmit Antennas," IEEE Transactions On Wireless Communications, vol. 1, No. 1, pp. 67-75, Jan. 2002.

Ye (Geoffrey) Li, Nambirajan Seshadri, and Sirikiat Ariyavistakul, "Channel Estimation for OFDM Systems with Transmitter Diversity in Mobile Wireless Channels," IEEE Journal on Selected Areas in Communications, vol. 17, No. 3, pp. 461-471, Mar. 1999.

Youjian Liu et al., "Space-Time Codes Performance Criteria and Design for Frequency Selective Fading Channels," Procedures of International Conference on Communication, pp. 1-5.

Yuan-Pei Lin et al., "Block Based DMT Systems With Reduced Redundancy," Procedures of International Conference on ASSP, Salt Lake City, UT, pp. 2357-2360, May 2001.

Yan Xin et al., "Linear Unitary Precoders for Maximum Diversity Gains with Multiple Transmit and Receive Antennas," Procedure of $34^{th}$ Asilomar Conference on Signals, Systems, and Computers, pp. 1553-1557, Pacific Grove, CA, Oct. 29-Nov. 1, 2000.

Yuze Zhang et al., "A Performance Analysis and Design of Equalization with Pilot Aided Channel Estimation," Procedures of the $47^{th}$ Vehicular Technology Conference, vol. 2, pp. 720-724, 1997.

Yuze Zhang et al., "Soft Output Demodulation on Frequency-Selective Rayleigh Fading Channels Using AR Channel Models," Procedures of Global Communications Conference, vol. 1, pp. 327-331, 1997.

Zhiqiang Liu et al., "Space-Time Block-Coded Multiple Access Through Frequency-Selective Fading Channels," IEEE Transactions on Communications, vol. 49, No. 6, pp. 1033-1044, Jun. 2001.

Zhiqiang Liu, et al., "Space-Time Coding for Broadband Wireless Communications," Wireless Communications Mobile Computers, vol. 1, No. 1, pp. 33-35, Jan.-Mar. 2001.

Zhiqiang Liu et al., "Transmit-Antennae Space-Time Block Coding for Generalized OFDM in the Presence of Unknown Multipath," IEEE Journal on Selected Areas In Communications, vol. 19, No. 7, pp. 1352-1364, Jul. 2001.

Zhiqiang Liu et al., "Linear Constellation Precoding for OFDM with Maximum Multipath Diversity and Coding Gains," IEEE Transactions On Communications, vol. 51, No. 3, pp. 416-427, Mar. 2003.

Zhiqiang Liu et al., Space-Time Frequency Coded OFDM Over Frequency-Selective Fading Channels, IEEE Transactions on Signal Processing, vol. 50, No. 10, pp. 2465-2476, Oct. 2002.

Zhiqiang Liu et al., "Space-Time Coding With Transmit Antennas for Multiple Access Regardless of Frequency-Selective Multipath," Procedures of Sensor Arry and Multichannel Signal Processing Workshop, pp. 178-182, Mar. 2000.

Zhengdao Wang et al., "Wireless Multicarrier Communications: Where Fourier Meets Shannon," IEEE Signal Processing Magazine, vol. 17, pp. 29-48, May 2000.

Zhengdao Wang et al., "Linearly Precoded or Coded OFDM Against Wireless Channel Fades?," Third IEEE Signal Processing Workshop on Signal Processing Advances in Wireless Communications, Taoyuan, Taiwan, pp. 1-4, Mar. 20-23, 2001.

Zhengdao Wang et al., "Optimality of Single-Carrier Zero-Padded Block Transmissions," Procedures of Wireless Communications and Networking Conference, vol. 2, pp. 660-664, 2002.

Caire et al., "Bit-Interleaved Coded Modulation," IEEE Transactions on Information Theory, vol. 44, No. 3, pp. 927-946, May 1998.

Courville et al., "Blind Equalization of OFDM Systems based on the Minimization of a Quadratic Criterion," Proc. of ICC, Dallas, USA, vol. 3, pp. 1318-1321, Jun. 1996.

Frenger et al., "Decision-Directed Coherent Detection in Multicarrier Systems on Rayleigh Fading Channels," IEEE Trans. On Vehicular Tech., vol. 48, No. 2, pp. 490-498, Mar. 1999.

Heath, Jr. et al., "Exploiting Input Cyclostationarity for Blind Channel Identification in OFDM Systems," IEEE Transactions on Signal Processing, vol. 47, No. 3, pp. 848-856, Mar. 1999.

Mignone et al., "CD3-OFDM: A Novel Demodulation Scheme for Fixed and Mobile Receivers," IEEE Transactions on Communications, vol. 44, No. 9, pp. 1144-1151, Sep. 1996.

Muquet et al., "A Subspace Based Blind and Semi-Blind Channel Identification Method for OFDM Systems," Proc. of IEEE-SP Workshop on Signal Proc. Advances in Wireless Comm., Annapolis, MD, pp. 170-173, May 9-12, 1999.

Muquet et al., "OFDM with Trailing Zeros Versus OFDM with Cyclic Prefix: Links, Comparisons and Applications to the Hiperlan/2 Systems," Proc. of Intl. Conf. On Com., New Orleans, pp. 1049-1053, Jun. 2000.

Ruiz et al., "Discrete Multiple Tone Modulation with Coset Coding for the Spectrally Shaped Channel," IEEE Transactions on Communications, vol. 4, No. 6, pp. 1012-1029, Jun. 1992.

Tufvesson et al. "Pilot Assisted Channel Estimation for OFDM in Mobile Cellular Systems," Proc. of the Vehicular Technology Conf., Phoenix, USA, vol. 3, pp. 1639-1643, May 1997.

van de Beek et al., "On Channel Estimation in OFDM Systems," Proc. of the Vehicular Technology Conf., Chicago, USA, vol. 2, pp. 815-819, Jul. 1995.

van Nee et al., "New High-Rate Wireless LAN Standards," IEEE Communications Magazine, vol. 37, No. 12, pp. 82-88, Dec. 1999.

Zhou et al., "Long Codes for Generalized FH-OFDMA Through Unknown Multipath Channels," IEEE Transactions on Communications, vol. 49, No. 4, pp. 721-733, Feb. 2001.

Zhou et al., "Frequency-Hopped Generalized MC-CDMA for Multipath and Interference Suppression," Proc. of MILCOM Conf., Los Angeles, CA, pp. 937-941, Oct. 22-25, 2000.

* cited by examiner

SPACE-TIME-FREQUENCY CODED OFDM COMMUNICATIONS OVER FREQUENCY-SELECTIVE FADING CHANNELS

This application claims priority from U.S. Provisional Application Ser. No. 60/464,307, filed Apr. 21, 2003, the entire content of which is incorporated herein by reference.

TECHNICAL FIELD

The invention relates to communication systems and, more particularly, transmitters and receivers for use in wireless communication systems.

BACKGROUND

Providing reliable high data rate services, e.g. real-time multimedia services, over wireless communication channels is a paramount goal in developing coding and modulation schemes. In wireless mobile communications, a channel that couples a transmitter to a receiver is often time-varying due to relative transmitter-receiver motion and multipath propagation. This time variation is commonly referred to as fading, and may severely impair performance of a wireless communication system. When a data rate for the system is high in relation to bandwidth, multipath propagation may become frequency-selective and cause intersymbol interference (ISI). Multipath fading in wireless communication channels causes performance degradation and constitutes the bottleneck for increasing data rates. In order to combat fading, techniques have been developed to exploit the available diversity.

As one example, space-time (ST) coding effectively combats fading while enhancing data rates by exploiting the presence of spatial diversity offered by multiple transmit and/or receive antennas which form a multiple-input-multiple-output (MIMO) communication system. ST coding relies on simultaneous coding across space and time to achieve diversity gain with high bandwidth efficiency. Two typical ST codes are ST trellis codes and ST block codes. In ST coding, the maximum achievable diversity advantage is equal to the number of transmit and receive antennas. Therefore, ST coding is constrained by the size and cost which a system can afford. As a result, exploitation of extra diversity dimensions, such as multipath diversity, is desirable.

Multipath diversity becomes available when frequency-selectivity is present, as is the typical case for broadband wireless channels. Multi-antenna transmissions over frequency-selective fading channels can provide a maximum diversity gain that is multiplicative in the number of transmit antennas, receive antennas, and the channel length. Space-frequency coding (SF) exploits multipath diversity by relying on simultaneous coding across space and frequency, i.e. combining an MIMO system with orthogonal frequency-division multiplexing (OFDM) modulation. Due to the prohibitive complexity in constructing SF codes, previously existing ST codes have been adopted by replacing the time domain with the frequency domain. For example, existing ST block codes and trellis-coded modulation (TCM) codes have been adopted but do not result in maximum spatial and frequency diversity gain guarantees.

Space-time-frequency (STF) coding exploits the spatial, temporal, and frequency diversities available in MIMO-OFDM systems by coding the information-bearing symbols among antennas in time and frequency. Simple repetition codes can be used to achieve the maximum diversity gain available in frequency-selective MIMO channels at the expense of bandwidth efficiency.

SUMMARY

In general, the invention is directed to space-time-frequency (STF) coding techniques for multi-carrier transmissions over frequency-selective fading channels. In particular, techniques are described for STF coding for MIMO-OFDM systems that provide maximum diversity, high coding gains, and low decoding complexity. During transmission, a set of generally correlated orthogonal frequency-division multiplexing (OFDM) subcarriers are divided into groups of subcarriers. Thus, the STF system is converted into a set of group STF (GSTF) subsystems, within which STF coding is applied to each GSTF subsystem. Subcarrier grouping preserves maximum diversity gains and simplifies both the code construction within each GSTF and decoding. ST coding techniques are used in designing STF block (STFB) codes and STF trellis (STFT) codes, which are applied within GSTF subsystems.

In one embodiment, the invention is directed to a wireless communication device comprising a subcarrier selector that divides a set of orthogonal frequency-division multiplexing (OFDM) subcarriers into two or more groups of subcarriers, and an encoder that applies a set of codes to each of groups of subcarriers to encode a data stream and produce an outbound data stream for transmission through a wireless communication channel.

In another embodiment, the invention is directed to a wireless communication device comprising a plurality of receive antennas, a demodulator, and a decoder. The plurality of receive antennas OFDM waveform, wherein the OFDM waveform has a plurality of subcarriers and carries a symbol data stream encoded within the subcarriers by separate application of an orthogonal set of codes to groups of the subcarriers. The demodulator receives the multi-carrier output waveform and produces a demodulated data stream. The decoder decodes the demodulated data stream and produces a stream of estimated symbols.

In an additional embodiment, the invention is directed to a method which groups a set of orthogonal frequency-division multiplexing (OFDM) subcarriers into two or more groups of subcarriers. Codes are applied to each of the groups of subcarriers to encode a data stream and produce an outbound data stream and an OFDM waveform is transmitted through a wireless communication channel in accordance with the outbound data stream.

In another embodiment, the invention is directed to a method which receives an orthogonal frequency-division multiplexing (OFDM) waveform, wherein the OFDM waveform has a plurality of subcarriers and carries a stream of symbols encoded within the subcarriers by separate application of a set of codes to groups of the subcarriers. The multi-carrier output waveform is demodulated to produce a demodulated data stream and the demodulated data stream is decoded to produce an estimated data stream. In yet another embodiment, the invention is directed to a computer-readable medium containing instructions. The instructions cause a programmable processor to group a set of orthogonal frequency-division multiplexing (OFDM) subcarriers into two or more groups of subcarriers and apply a set of codes to each of the groups of subcarriers to produce an outbound data stream. An OFDM waveform is transmitted in accordance with the outbound data stream.

In an additional embodiment, the invention is directed to a system comprising a transmitter and receiver. The transmitter applies codes to groups of orthogonal frequency-division multiplexing (OFDM) subcarriers to encode the subcarrier groups in space, time and frequency, wherein the transmitter outputs an OFDM waveform via a plurality of transmit antennas in accordance with the encoded subcarrier groups. The receiver receives the OFDM waveform and produces a stream of estimated symbols.

The STF coding techniques for multi-carrier transmissions over frequency selective fading channels may offer one or more advantages. For example, a maximum diversity up to order $N_tN_r(L+1)$ can be achieved, where $N_t$ is the number of transmit antennas, $N_r$ is the number of receive antennas, and (L+1) is the number of taps corresponding to each FIR channel. Moreover, this maximum diversity may be achieved with lower complexity code construction and decoding algorithms.

The details of one or more embodiments of the invention are set forth in the accompanying drawings and the description below. Other features, objects, and advantages of the invention will be apparent from the description and drawings, and from the claims.

DETAILED DESCRIPTION

Throughout the Detailed Description, bold upper letters denote matrices, bold lower letters stand for column vectors; $(\bullet)^T$, $(\bullet)^*$, and $(\bullet)^H$ denote transpose, conjugate, and conjugate transpose, respectively; $\text{diag}(d_1, \ldots, d_p)$ denotes a P×P diagonal matrix with diagonal entries $d_1, \ldots, d_p$; and $I_P$ stands for the P×P identity matrix.

Figure 1:
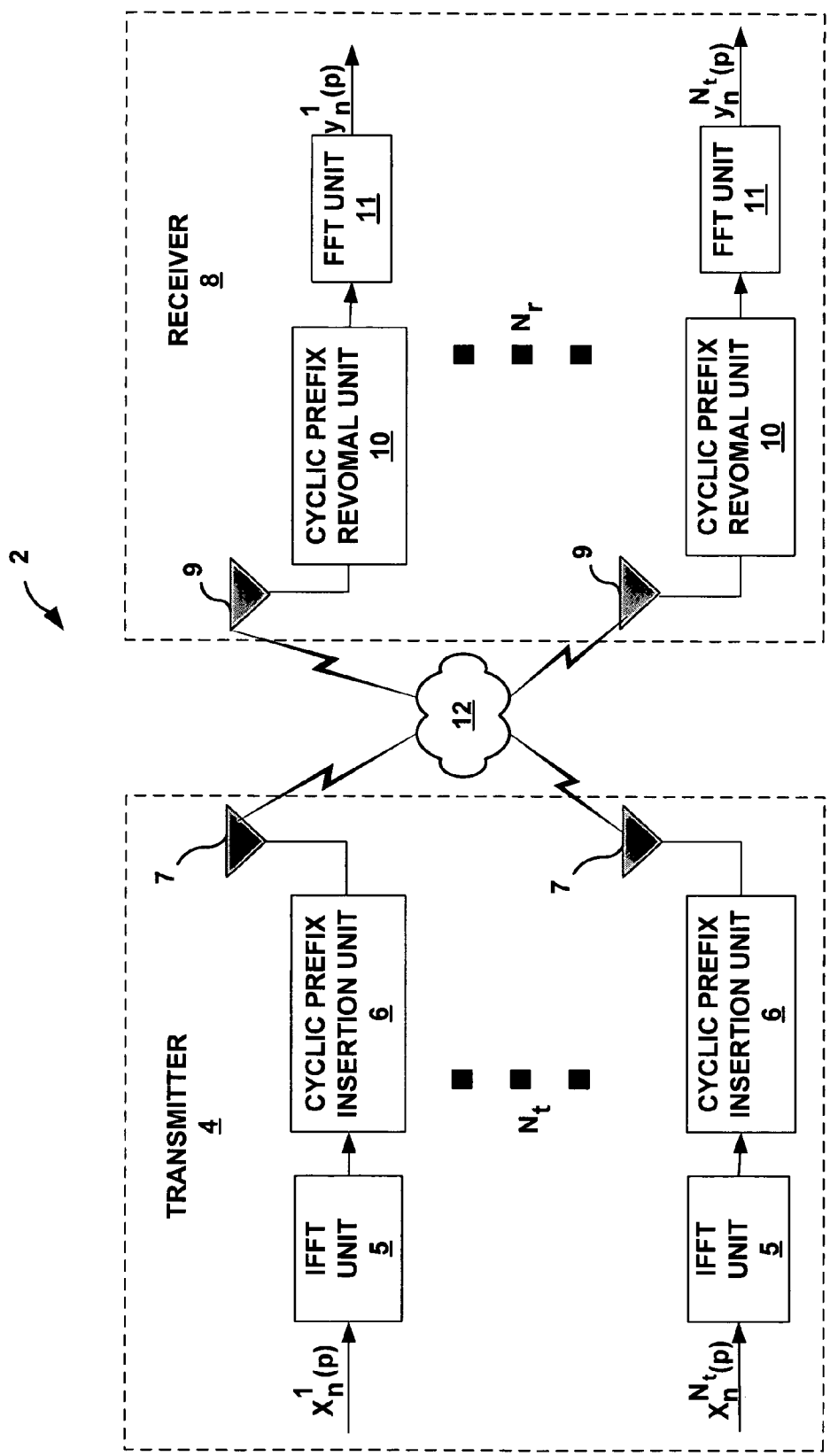
FIG. 1 is a block diagram illustrating an exemplary wireless communication system in which a transmitter and a receiver implement space-time-frequency (STF) coding techniques.

FIG. 1 is a block diagram illustrating multi-antenna orthogonal frequency-division multiplexing (OFDM) wireless communication system 2 in which transmitter 4 communicates data to receiver 8 through wireless channel 12. In particular, FIG. 1 illustrates the discrete-time equivalent baseband model in which transmitter 4 transmits data with $N_t$ transmit antennas 7 and receiver 8 receives data with $N_r$ receive antennas 9. OFDM has been adopted by many standards including digital audio and video broadcasting (DAB, DVB) in Europe and high-speed digital subscriber lines (DSL) in the United States. OFDM has also been proposed for local area mobile wireless broadband standards including IEEE 802.11a, MMAC and HIPERLAN/2. Wireless communication system 2 represents a multiple-input-multiple-output (MIMO) OFDM system having $N_c$ subcarriers employed per antenna transmission.

In general, the invention described herein provides space-time-frequency (STF) coding techniques for MIMO-OFDM systems with maximum diversity, high coding gains, and low decoding complexity. In particular, transmitter 4 divides a set of generally correlated OFDM subcarriers into groups of subcarriers. Consequently, STF system 2 is converted into a set of group STF (GSTF) subsystems, within which STF coding is applied to each GSTF subsystem. Space-time (ST) coding techniques are used in constructing STF block (STFB) codes and STF trellis (STFT) codes STF codes for application by the GSTF systems. The described techniques preserve maximum diversity gains and simplify both the code construction and decoding algorithm. The techniques described herein may be applied to uplink and/or downlink transmissions, i.e. transmissions from a base station to a mobile device and vice versa. Transmitters 4 and receivers 8 may be any device configured to communicate using a multi-user wireless transmission, including a cellular distribution station, a hub for a wireless local area network, a cellular phone, a laptop or handheld computing device, a personal digital assistant (PDA), or other device.

In the exemplary embodiment of FIG. 1, transmitter 4 has multiple transmit paths corresponding to the $N_t$ transmit antennas 7. Each transmit path includes an Inverse Fast Fourier Transform unit 5 and a cyclic prefix (CP) insertion unit 6. Similarly, receiver 8 has multiple receive paths corresponding to the $N_r$ receive antennas 9. Each receive path includes a CP removal unit 10 and a Fast Fourier Transform unit 11. The IFFT units 5 of transmitter 4 and FFT units 11 of receiver 8 convert OFDM transmissions, which propagate through fading channel 12 with possible intersymbol interference (ISI), into a set of parallel ISI-free subcarriers. To avoid inter-block interference (IBI) between successive IFFT processed blocks, CP insertion unit 6 inserts a cyclic prefix (CP) having a length greater than or equal to the order of channel 12 for each transmission block. With the CP length at least as long as the order of channel 12, IBI is avoided by CP removal unit 10 discarding the received samples corresponding to the CP at receiver 8.

In general, fading channel 12 between the µ th transmit antenna 7 and ν th receive antenna 9 is frequency-selective but time-flat, and can be described by the discrete-time baseband equivalent impulse response vector $h_{\mu\nu} := [h_{\mu\nu}(0), \ldots, h_{\mu\nu}(L)]^T$, with L representing the order of channel 8. The channel impulse response includes the effects of transmit receive filters, physical multipath, and relative delays among transmit and receive antennas 7, 9.

The data symbol transmitted on the p th subcarrier from the µ th transmit antenna 7 during the n th OFDM symbol interval can be denoted $x_n^\mu(p)$. As defined, the symbols $\{x_n^\mu(p), \mu=1, \ldots, N_t, p=0,1, \ldots, N_c-1\}$ are transmitted in parallel on $N_c$ subcarriers $N_t$ transmit antennas 7. The three variables µ, n, and p introduced index space, time, and frequency dimensions associated with the transmission of $x_n^\mu(p)$. As a result, $x_n^\mu(p)$ can be viewed as a point in a three-dimensional (3-D) STF parallelepiped.

At receiver 8, each receive antenna 9 receives a noisy superposition of the multi-antenna transmissions through fading channel 12. For brevity, ideal carrier synchronization, timing, and perfect symbol-rate sampling is assumed. After CP removal and FFT processing at receiver 8, the received data sample $y_n^\nu(p)$ at the ν th receive antenna 9 can be expressed as given in equation (1). $H_{\mu\nu}(p)$ is the subcarrier gain from the µ th transmit antenna 7 to the ν th receive antenna 9 evaluated on the p th subcarrier and is given in equation (2). The additive noise $w_n^\nu(p)$ is circularly symmetric, zero-mean, complex Gaussian with variance $N_0$ that is also assumed to be statistically independent with respect to n, ν, p.

$$y_n^v(p) = \sum_{\mu=1}^{N_t} H_{\mu v}(p) \mathbf{x}_n^\mu(p) + w_n^v(p), \quad (1)$$

$$v = 1, \ldots, N_r \; p = 0, \ldots, N_c - 1$$

$$H_{\mu v}(p) := \sum_{l=0}^{L} h_{\mu v}(l) e^{-j(2\pi/N_c)lp} \quad (2)$$

Equation (1) represents a general model for multi-antenna OFDM systems. The method in which data symbols $x_n^v(p)$ are generated from information symbols $s_n$ creates trade-offs among performance, decoding complexity, and transmission rate. In wireless system 2, the generation of $x_n^v(p)$ is performed via STF coding, which is described in further detail in FIG. 2.

Figure 2:
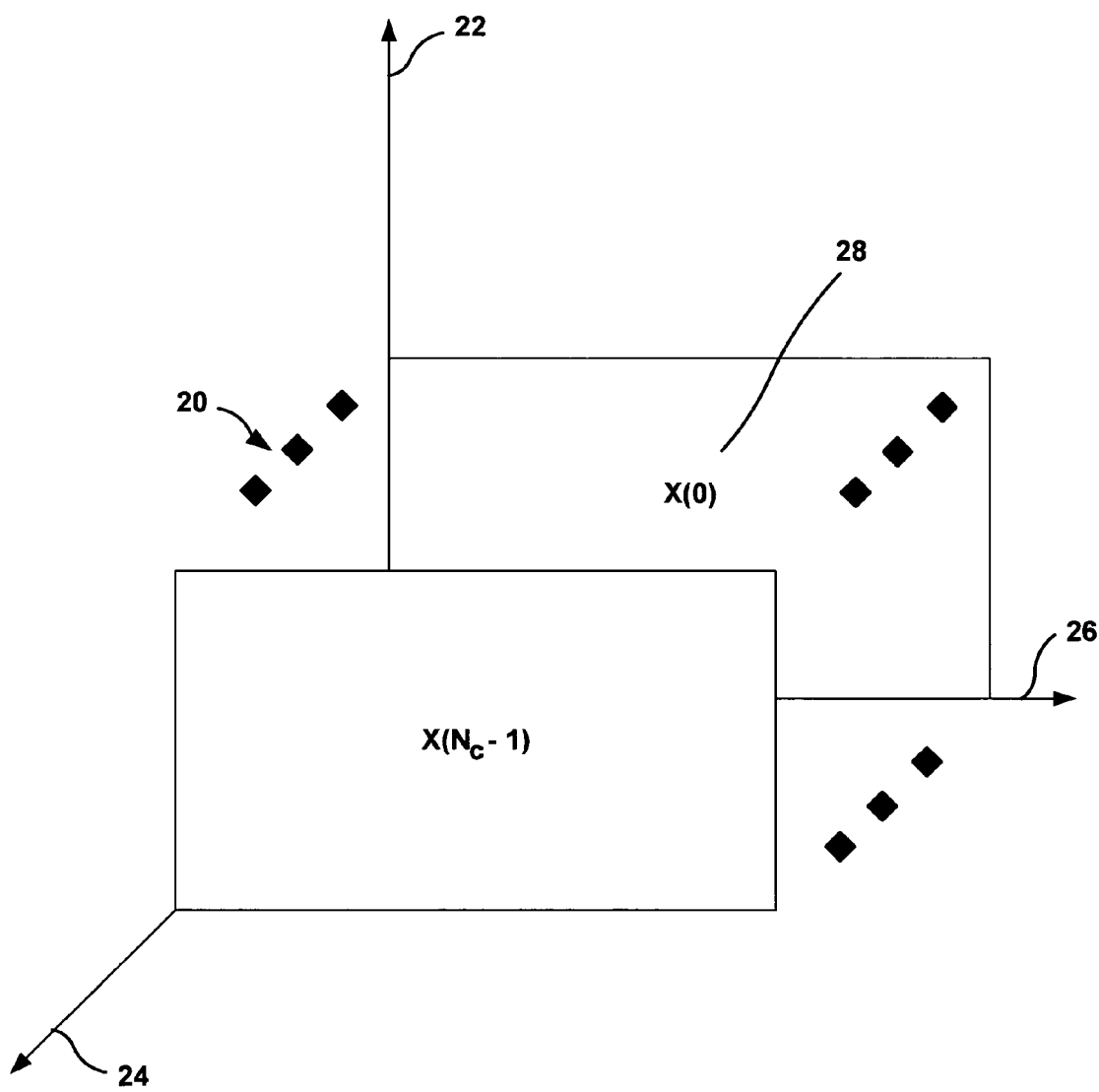
FIG. 2 is a conceptual diagram illustrating STF coded transmissions.

FIG. 2 is a conceptual diagram illustrating STF codewords 28 as the collection of transmitted symbols within parallelepiped 20, spanned by $N_t$ transmit antennas 22, OFDM symbol intervals 24, and $N_c$ subcarriers 26. Therefore, one STF codeword contains $N_t N_x N_c$ transmitted symbols $\{x_n^v(p), \mu=1, \ldots, N_t, p=0,1, \ldots, N_c-1\}$, which for mathematical convenience can be organized in a block matrix as given in equation (3) where $X(p)$ represents parallel transmissions over different frequencies and is defined in equation (4).

$$X := [X(0), \ldots, X(N_c-1)] \quad (3)$$

$$X(p) := \begin{bmatrix} x_0^1(p) & \cdots & x_{N_x-1}^1(p) \\ \vdots & & \vdots \\ x_0^{N_t}(p) & \cdots & x_{N_x-1}^{N_t}(p) \end{bmatrix} \quad (4)$$

Let the MIMO channel matrix be defined $H(p) \in C^{N_r \times N_t}$ with $(v, \mu)$th entry $[H(p)]_{v\mu} = H_{v\mu}(p)$, the received sample matrix $Y(p) \in C^{N_r \times N_x}$ with $[Y(p)]_{vn} = y_n^v(p)$, and noise matrix $W(p) \in C^{N_r \times N_x}$. Equation (5) below follows from equation (1) which confirms that OFDM yields parallel $X(p)$ transmissions over different frequencies. Because each $X(p)$ can be thought of as being transmitted using an ST system, the $N_c$ in equation (5) provides a model for the 3-D STF model illustrated in FIG. 2. In general, the transmissions of $x_n^v(p)$s are separable in both time and frequency but not in space. This separability is useful when developing a space-virtual-time system for the construction of STFT codes, which is described in detail later.

$$Y(p) = H(p)X(p) + W(p), p=0, \ldots, N_c-1 \quad (5)$$

Suppose that X has been generated by $\overline{N}_1$ information symbols collected in the block $s := [s_0, \ldots, s_{\overline{N}_1-1}]^T$. STF coding is then defined as an one-to-one mapping $\Psi$ as given in equation (6).

$$\Psi : s \to X \quad (6)$$

Because X is described in equation (3) by three dimensions, STF coding simultaneously encodes information over space, time, and frequency, as is implied by the name. The design of $\Psi$ is discussed in greater detail below.

Let $A_s \ni s_n$ be the alphabet set to which the information symbol $s_n$ belongs, and let $|A_s|$ be the cardinality of $A_s$. Because X is uniquely mapped from s, the number of possible STF codewords X is $|A_s|^{\overline{N}_1}$, which can be collected into a finite set $A_x$ with $|A_x| = |A_s|^{\overline{N}_1}$. From a conceptual point of view, STF coding is equivalent to constructing the finite set $A_x$, as well as specifying the mapping $\Psi$. By the definition of X, it is clear that transmitting $\overline{N}_1$ information symbols uses $N_c$ subcarriers and occupies $N_x$ OFDM symbols. Therefore, the STF code rate is defined as given in equation (7). Accounting for the CP and the constellation size $|A_s|$, the transmission rate is therefore given in equation (8).

$$R = \frac{\overline{N}_1}{N_c N_x} \quad (7)$$

$$R_T = \frac{\overline{N}_1}{(N_c + L)N_x} \log_2 |A_s| \text{ bps/Hz} \quad (8)$$

The techniques described herein optimize tradeoffs among performance, rate, and complexity based on equation (1) or its matrix counterpart given in equation (5) through design of $\Psi$ and choosing system parameters. In order to achieve optimal tradeoffs, the design of STF coding is linked with the performance of the STF transmission modeled in equation (5).

The design criteria for the described STF coding is derived while keeping in mind the importance of simplifying the code design as much as possible without sacrificing system performance. The derivations are based on the following three assumptions.

1.) Maximum likelihood (ML) detection is performed with channel state information (CSI) that is known at the receiver. CSI can be acquired either via preamble training or via inserted pilots.

2.) High signal-to-noise ratio (SNR) is observed at the receiver.

3.) The $N_t(L+1) \times 1$ channel vector $h_v := [h_{1v}^T, \ldots, h_{N_t v}^T]^T$ is zero-mean, complex Gaussian with full-rank correlation matrix $R_h = E(h_v h_v^H)$. However, $h_v$ s for different $v$ are statistically independent, which can be satisfied by sufficiently separating the multiple receive antennas.

Note that $R_h$ in the third assumption allows for correlated wireless channel taps with, e.g. an exponential power profile. However, as will be proved later in the Detailed Description, the described STF codes are independent of $R_h$ as long as $R_h$ has full rank. Consequently, the design of STF codes can be simplified.

The optimal performance when STF transmissions obey the assumptions above is examined in the following paragraphs. Even when exact performance analysis is possible, it may not lead to meaningful design criteria. Alternatively, analysis can be carried out by evaluating pairwise error probability (PEP). Recalling equation (5), the PEP $P(X \to X')$ is defined as the probability that ML decoding of X erroneously decides X' in favor of the actually transmitted X.

According to equation (5) ML decoding of X from $\{Y(p)\}_{p=0}^{N_c-1}$ yields equation (9) where $\|\bullet\|$ denotes the Frobenius norm. Conditioned on $H(p)$ s, it then follows that the PEP is given below in equation (10) where $d^2(X,X')$ is given in equation (11) and $\Delta(p) := X(p) - X'(p)$ $$\hat{X} = \arg\min_{X \in A_x} \sum_{p=0}^{N_c-1} \|Y(p) - H(p)X(p)\|^2 \quad (9)$$

$$P(X \to X' \mid H(0), \ldots, H(N_c-1)) \leq \exp\left[-\frac{d^2(X, X')}{4N_0}\right] \quad (10)$$

-continued $$d^2(X, X') = \sum_{p=0}^{N_c-1} \|H(p)\Delta(p)\|^2 \quad (11)$$

Defining (L+1)×1, equation (2) can be expressed as equation (12) as follows.

$$H_{\mu\nu}(p) = \bar{h}_{\mu\nu}^T \omega(p) \quad (12)$$

Because $R_h$ is positive definite Hermitian symmetric, $R_h$ can be decomposed as $R_h = B_h B_h^H$, where $B_h \in \mathbb{C}^{N_t(L+1) \times N_t(L+1)}$ is the square root of $R_h$ with full rank. The $N_t(L+1) \times 1$ pre-whitened channel vector $\bar{h}_\nu$ is further defined as $\bar{h}_\nu := [\bar{h}_{1\nu}(0), \ldots, \bar{h}_{1\nu}(L), \ldots, \bar{h}_{N_t\nu}(0), \ldots, \bar{h}_{N_t\nu}(L)]^T = B_h^{-1} h$. It follows from the third assumption that $\bar{h}_{\mu\nu}(l)$ s are independent and identically distributed (i.i.d.), zero mean, complex Gaussian with variance $1/(2L+2)$ per dimension. Substituting equation (12) into equation (11) and based on eigen-analysis and standard deviations, equation (10) can be rewritten as equation (13) below where equations (14-16) define $\bar{\Lambda}_e$, $\Lambda_e$, $\Omega(p)$ respectively. The Kronecker product is denoted by $\otimes$.

$$d^2(X, X') = \sum_{\nu=1}^{N_r} h_\nu^T \Lambda_e h_\nu^* = \sum_{\nu=1}^{N_r} \bar{h}_\nu^T \bar{\Lambda}_e \bar{h}_\nu^* \quad (13)$$

$$\bar{\Lambda}_e := B_h^T \Lambda_e B_h^* \quad (14)$$

$$\Lambda_e := \sum_{p=0}^{N_c-1} \Omega(p) \Delta^H(p) \Omega^H(p) \quad (15)$$

$$\Omega(p) = I_{N_t} \otimes \omega(p) \quad (16)$$

Because the design of STF coding should not depend on particular channel realizations, it is appropriate to consider the expected PEP averaged over all channel realizations. Assume that $\bar{\Lambda}_e$ has rank $\mathrm{rank}(\bar{\Lambda}_e)$ and denote its nonzero eigen-values as $\lambda_{e,i}$. Using the second and third assumptions from above, the expected PEP is then given by equation (17) below where equations (18, 19) are the pairwise diversity and coding advantages, respectively.

$$P(X \to X') \leq \left( G_{e,c} \frac{1}{4N_0} \right)^{-G_{e,d}} \quad (17)$$

$$G_{e,d} = N_r \cdot \mathrm{rank}(\bar{\Lambda}_e) \quad (18)$$

$$\prod_{i=1}^{\mathrm{rank}(\bar{\Lambda}_e)} \left[ \frac{1}{L+1} \lambda_{e,i} \right]^{1/\mathrm{rank}(\bar{\Lambda}_e)} \quad (19)$$

Because both $G_{e,d}$ and $G_{e,c}$ depend on choice of the pair $\{X, X'\}$, the overall diversity and coding advantages are further defined in equations (20, 21) respectively. The minimization is taken over all pairs of distinct STF codewords in 3-D.

$$G_d = \min_{\forall X \neq X' \in A_X} G_{e,d} \quad (20)$$

$$G_c = \min_{\forall X \neq X' \in A_X} G_{e,c} \quad (21)$$

At reasonably high SNR, the diversity advantage plays a more substantial role than the coding advantage in improving the performance in wireless fading channels. Consequently, in one embodiment, the described STF coding techniques focus on achieving maximum diversity advantage while improving coding advantage as much as possible.

The expression of $G_{e,d}$ and $G_{e,c}$ in equations (17) and (18) have important implications on the design of the described system. First, the dimensionality of $\bar{\Lambda}_e$ reveals that the maximum diversity advantage in the described system is $$G_d^{\max} = N_r N_t (L+1),$$

which is the same as that for ST codes and SF codes with maximum diversity gains. Second, because $B_h$ has full rank, the maximum diversity advantage can be achieved if and only if $\Lambda_e$ has full rank. Therefore, the number of linearly independent rows or columns contributed by each summand, $\Omega(p)\Delta^H(p)\Omega^H(p)$ in $\Lambda_e$ is no more than $N_t$ because the maximum rank of each summand is $N_t$. As a result, in order to maximize the diversity advantage, the number of subcarriers should be greater than or equal to the order of the channel, i.e. $N_c \geq L+1$. The latter implies that to achieve maximum diversity advantage, joint coding should be applied across at least $L+1$ subcarriers. However, since $\bar{\Lambda}_e$ can have full rank even when $N_x = 1$, coding across multiple subcarriers is not required. In other words, maximum diversity advantage can be achieved with SF coding, which is subsumed by STF coding. As will be described in greater detail below, taking into account the time dimension substantially simplifies the design of the STF code and offers design flexibility. Third, the maximum diversity advantage is achieved, i.e. $\Lambda_e$ has full rank, when $G_{e,c}$ can be factored as given in equation (22).

$$G_{e,c} = \frac{1}{L+1} [\det(\bar{\Lambda}_e)]^{1/N_t(L+1)} = \frac{1}{L+1} [\det(R_h)\det(\Lambda_e)]^{1/N_t(L+1)} \quad (22)$$

Therefore, maximizing the coding advantage translates into maximizing the determinant $\Lambda_e$, which is independent of the channel correlation when $R_h$ has full rank.

Thus far, the codeword $A_x$ has been linked to the diversity advantage $G_d$, and the coding advantage $G_c$. Rank and determinant design criteria for STF coding involve designing the set $A_x$ with codewords $X$ of size $N_t \times N_x N_c$ so as to maximize both $G_d$ and $G_c$. These design criteria are reduced to those proposed for SF coding when $N_x = 1$. However, $N_c$ is typically a large number in practical OFDM systems, e.g. $N_c = 48$ in HIPERLAN 2. Therefore, design of STF codes or SF codes for such systems requires large size codewords. Because of the difficulties encountered in designing ST or SF codes of a much smaller size, it follows that such a design will be even more challenging, without any effort to alleviate the "curse of dimensionality." The techniques described herein employ subcarrier grouping to reduce the dimensionality and thus facilitate design and decoding.

The first step toward subcarrier grouping for STF coding is to choose the number of subcarriers. In some embodiments, the number of subcarriers is equal to an integer multiple of the channel length as given in equation (23), where $N_g$ is a positive integer denoting the number of groups.

$$N_c = N_g(L+1) \tag{23}$$

The second step toward subcarrier grouping for STF coding is to split the $N_t \times N_x N_c$ STF codeword X into $N_g$ group STF (GSTF) codewords $X_g$, $g=0, \ldots, N_g-1$, as given in equation (24) where $X_g(l) = X(N_g l + g)$.

$$X_g = [X_g(0), \ldots, X_g(L)] \tag{24}$$

Accordingly, the STF system of equation (5) is divided into $N_g$ GSTF (sub)systems which are described through the input-output relationships of equation (25) where $Y_g(l)$, $H_g(l)$, and $W_g(l)$ are defined in equations (26-28) respectively.

$$Y_g(l) = H_g(l) X_g(l) + W_g(l), l=0,1,\ldots,N_g-1 \tag{25}$$

$$Y_g(l) = Y(N_g l + g) \tag{26}$$

$$H_g(l) = H(N_g l + g) \tag{27}$$

$$W_g(l) = W(N_g l + g) \tag{28}$$

Each GSTF subsystem is a simplified STF system with a substantially smaller size in the frequency dimension in comparison with the original STF system. In order to take advantage of subcarrier grouping, STF coding is applied within each GSTF subsystem, i.e. STF coding is performed to generate $X_g$ s individually rather than generating X as a whole. Such subcarrier grouping does not result in any reduction in the diversity advantage but does result in reducing the design complexity substantially. GSTF coding is distinguished from STF coding in equation (6) by hereafter naming the STF coding for each GSTF subsystem as GSTF coding and denoting it as such by the unique mapping of equation (29) where $N_l \times 1$ is the information symbol block used to generate $X_g$. It then follows that $\overline{N}_l$ and thus, the code rate of equation (7) can be re-expressed as in equation (30).

$$\Psi_g : s_g \to X_g \tag{29}$$

$$R = \frac{N_1}{(L+1)N_x} \tag{30}$$

Therefore, the design of $\Psi$ is converted into the design of the set $\{\Psi_g\}_{g=0}^{N_g-1}$. Because all $\Psi_g$ s are uniform, only one $\Psi_g$ is described in detail in the following paragraphs.

The design criteria for the GSTF codes $X_g$ are derived by analyzing the expected PEP $\bar{p}$ for two distinct GSTF codewords $X_g := [X_g(0), \ldots, X_g(L)]^T$ and $X'_g := [X'_g(0), \ldots, X'_g(L)]^T$. First, the notation defined in equations (31-34) is introduced.

$$\Delta_g(l) := X_g(l) - X'_g(l) \tag{31}$$

$$\Omega_g(l) := \Omega(N_g l + g) \tag{32}$$

$$\Lambda_{e,g} := \sum_{l=0}^{L} \Omega_g(l) \Delta_g(l) \Delta_g^H(l) \Omega_g^H(l) \tag{33}$$

$$\overline{\Lambda}_{e,g} := B_h^T \Lambda_{e,g} B_h^* \tag{34}$$

Following steps similar to those used to derive equation (17), the pairwise diversity advantage for a GSTF subsystem is given in equation (35) where $\text{rank}(\overline{\Lambda}_{e,g})$ denotes the rank of $\overline{\Lambda}_{e,g}$. When $\overline{\Lambda}_{e,g}$ has full rank $N_t(L+1)$, the coding advantages for GSTF subsystems is given by equation (36) which is the per group counterpart of equation (22).

$$G_{g,e,d} = N_r \text{rank}(\overline{\Lambda}_{e,g}) \tag{35}$$

$$G_{g,e,c} = \frac{1}{L+1} [\det(R_h) \det(\Lambda_{e,g})]^{1/N_t(L+1)} \tag{36}$$

As mentioned previously, the goal is to preserve maximum diversity advantage and achieve the largest possible coding advantage. Letting $A_{x,g}$ be the set of all possible $X_g$ s and following the arguments presented earlier, this goal can be translated into designing $A_{x,g}$ such that $\overline{\Lambda}_{e,g}$ has full rank and $\det(\Lambda_{e,g})$ is maximized. Although subcarrier grouping clearly simplifies the design of $X_g$ in comparison to X, the design of $X_g$ is still challenging. However, by exploiting the fact that the described STF system is designed irrespective of the channel correlation, the design can further be simplified by letting $R_h = I$. For convenience, the resulting system is termed hereafter as "dummy" STF system.

Because $R_h = I$ in the dummy system, the $N_r N_t(L+1)$ channel taps $h_{\mu\nu}(l)$ for $l=0,\ldots,L, \mu=1,\ldots,N_t, \nu=1,\ldots,N_r$ become i.i.d., zero-mean, complex Gaussian with variance $1/(2L+2)$ per dimension according to the third assumption. It then follows that $\forall \mu, \mu', \nu, \nu'$, and $p_1 \neq p_2$ from which it is deduced that $H_{\mu\nu}(p_1)$ and $H_{\mu'\nu'}(p_2)$ are statistically independent as shown in equation (37).

$$E[H_{\mu\nu}(p_1) H^*_{\mu'\nu'}(p_2)] = 0, \text{ if } \text{mod}(p_1-p_2, N_g) = 0 \tag{37}$$

Consequently, the dummy GSTF subsystem possesses the following property. When $R_h = I$ and the parameters are chosen according to equation (22), all subcarriers within $\{H_g(l)\}_{l=0}^L$ of each GSTF subsystem are statistically independent.

By utilizing this property, the PEP analysis is re-preformed to obtain the counterparts of equations (35, 36) respectively as equations (38, 39) where $\Lambda_e(l) := \Delta_g(l) \Delta l(l)$.

$$G_{g,e,d} = N_r \sum_{l=0}^{L} \text{rank}[\Lambda_e(l)] \tag{38}$$

$$G_{g,e,c} = \left[ \prod_{l=0}^{L} \det[\Lambda_e(l)] \right]^{1/N_t(L+1)} \tag{39}$$

Because the dummy STF system is a special case of the designed STF system, the diversity and coding advantages in equations (38, 39) are identical to those in equations (35, 36) with $R_h = I$. Targeting maximum diversity and coding advantages as paramount goals, the following two design criteria are deduced.

The first design criteria is referred to as the "sum-of-ranks" criterion and requires designing $A_{x,g}$ such that $\forall X_g \neq X'_g$, the matrices of equation (40) have full rank. The second design criteria is referred to as the "product-of-determinants" criterion and requires that for the set of matrices satisfying the sum-of-ranks criterion, design $A_{x,g}$ such that $\forall X_g \neq X'_g$, which is the minimum of equation (41), is maximized.

$$\Lambda_e(l) = [X_g(l) - X'_g(l)][X_g(l) - X'_g(l)]^H, \forall l \in [0, L] \tag{40}$$

$$\prod_{l=0}^{L} \det[\Lambda_e(l)] \qquad (41)$$

In order to achieve maximum diversity gain, it follows from the first design criteria that $N_x \geq N_t$. Therefore, coding across different time slots may be advantageous in GSTF coding. Compared with SF coding where no time-dimension processing is performed, allowing for coding across time provides several advantages. First, checking the dimensionality of $X_g$ per equation (24) reveals that the minimum size of the GSTF codewords is $N_t \times N_t(L+1)$ whereas a typical SF codeword size is $N_t \times N_c$. In typical applications, $N_{c>N_t}(L+1)$ which results in lower design complexity for GSTF coding relative to existing ST and SF codes. Second, $_l$ in both equations (40) and (41) is related to $_l$ in a more simplified manner as compared with existing SF codes. This enables GSTF codes to be constructed with improved performance over existing SF codes, which will be verified by simulations in following figures.

The dimensionality of $\Lambda_e(l)$ reveals the maximum diversity advantage of each GSTF subsystem is $N_t N_r(L+1)$, which is equivalent to the maximum diversity advantage of STF systems without subcarrier grouping. Thus, subcarrier grouping does not sacrifice diversity order even with arbitrary subcarrier grouping, as opposed to grouping according to equation (24), as long as each GSTF subsystem contains L+1 subcarriers. However, arbitrary subcarrier grouping generally involves correlated subcarriers per dummy GSTF system, which decrease the coding advantage. Because STF code design does not depend on channel correlation, the subcarrier grouping scheme of equation (24) is optimal in the sense of maximizing coding advantage for a GSTF system of a given size.

It should be noted that for channels with L=0, the described STF design criteria are, respectively, reduced to the rank and determinant criteria proposed for flat Rayleigh fading channels in existing ST codes for high data-rate wireless communication. Additionally, when $N_x=1$, the described STF design criteria become the distance and product criteria used to construct existing ST codes for fast fading channels.

Figure 3:
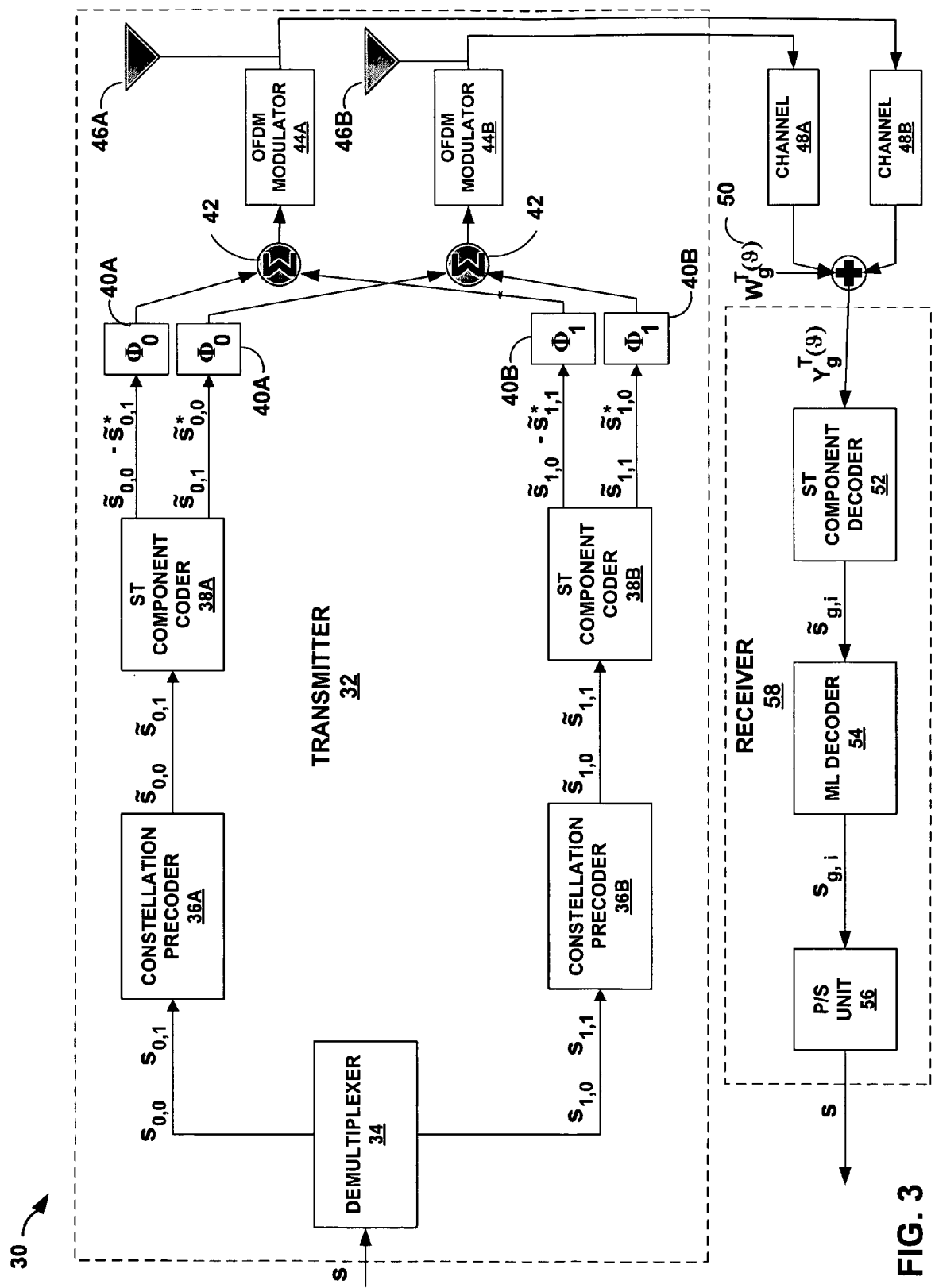
FIG. 3 is an example block diagram of another wireless communication system using space-time-frequency (STF) coding techniques in accordance with the principles of the invention.

FIG. 3 is an example block diagram illustrating multi-antenna OFDM wireless communication system 30 in which transmitter 32 communicates with receiver 58 through channels 48A and 48B (collectively, "channel 48") with the STF coding techniques in accordance with the principles of the invention. In particular, FIG. 3 transmitter 32 transmits data with $N_g=2$ and $N_t=2$ transmit antennas 46A and 46B (collectively "transmit antennas 46"). Receiver 58 receives data through channel 48 which is frequency-selective but time-flat and is described by the discrete-time baseband equivalent impulse response as given previously.

In general, transmitter 32 jointly encodes an outbound data stream in space, time and frequency and modulates the outbound data stream to produce a multi-carrier output waveform. The multi-carrier output waveform is divided into groups with each group having subcarriers. Transmitter 32 applies codes, which may take the form of block codes or trellis codes, to the groups of subcarriers. Receiver 58 uses an ML decoding algorithm to recover the received multi-carrier output waveform. Maximum diversity is achieved by employing subcarrier grouping as described herein, while linear precoding, for example, allows maximum coding gains and low-complexity decoding.

Linear encoding increases the bandwidth efficiency of GSTF codes and is carried out in two successive stages: constellation precoding and ST component coding. Constellation precoders 36A and 36B (collectively "constellation precoders 36") enables multipath diversity, while ST component coder 38A and 38B (collectively "ST component coders 38") collects spatial diversity. The resulting GSTF codes are capable of achieving maximum diversity advantages while allowing low-complexity two-stage optimal decoding. Based on the previously discussed observations, the design of GSTF codewords $X_g$ can be accomplished by the joint design of ST codewords $\{\tilde{X}_g(l)\}_{l=0}^{L}$ in conjunction with the stated design criteria. GSTF block (GSTFB) codes are described in detail below followed by GSTF trellis (GSTFT) codes.

Information blocks $s_g$ are received by demultiplexer 34 and are chosen to have $N_f = N_g(L+1)$ information symbols, where $N_s$ is dependent on $N_t$ and is specified below. Demultiplexer 34 demultiplexes information blocks $s_g$ into $\{s_{g,i}, i=0, \ldots, N_s-1\}$ sub-blocks such that $s_g := [s_{g,0}^T, \ldots, s_{g,N_s-1}^T]^T$. Constellation precoders 36 distributes information symbols over multiple subcarriers by precoding $s_{g,i}$ to obtain $\tilde{s}_{g,i}$ where $\Theta \in \mathbb{C}^{(L+1) \times (L+1)}$ denotes the square constellation precoder. The precoded blocks $\tilde{s}_{g,i}$ s are subsequently processed to form the GSTF codeword $X_g$ via ST component coder 38.

The design of ST component coders 38 may extend from the generalized complex orthogonal design (GCOD) described in V. Tarokh, N. Seshadri, and A. R. Calderbank, "Space-time block codes from orthogonal designs," in IEEE Transactions on Information Theory, vol. 45, pp. 1456-1467, July 1999, which is incorporated herein by reference. Let $O_{N_t}$ be an $N_d \times N_t$ matrix with nonzero entries drawn from the set $_i$. If equation (42) is satisfied for some positive constant $\alpha$, then $O_{N_t}$ is referred to as a GCOD in variables $_{N_s-1}$. Provided GCODs exist, a GCOD can be found with size $(N_s, N_d)$ which satisfies equation (43). Using the nonzero entries $_i$, $O_{N_t}$ can be represented as given in equation (44) where, the real matrices $\{A_i \in \mathbb{R}^{N_d \times N_t}, B_i \in \mathbb{R}^{N_d \times N_t}, i=0, \ldots, N_s-1\}$ satisfy the properties given in equations (45, 46) $\forall i, i'$, respectively.

$$O_{N_t}^H O_{N_t} = \alpha \sum_{i=0}^{N_s-1} |d_i|^2 I_{N_t} \qquad (42)$$

$$(N_s, N_d) = \begin{cases} (2,2) & \text{if } N_t = 2 \\ (3,4) & \text{if } N_t = 3, 4 \\ (N_t, 2N_t) & \text{if } N_t > 4 \end{cases} \qquad (43)$$

$$O_{N_t} = \sum_{i=0}^{N_s-1} (A_i d_i + B_i d_i^*) \qquad (44)$$

$$A_i^T A_{i'} + B_i^T B_{i'} = \alpha I_{N_t} \delta(i-i') \qquad (45)$$

$$A_i^T B_{i'} = \qquad (46)$$

The properties given in equations (45, 46) are useful in decoding. For example, when $N_t=2$, the GCOD $O_{N_2}$ reduces to Alamouti's ST block code matrix given in equation (47) which can be represented as in equation (44) using equations (48-51) below.

$$O_2 = \begin{bmatrix} d_0 & d_1 \\ -d_1^* & d_0^* \end{bmatrix} \qquad (47)$$

-continued $$A_0 = \begin{bmatrix} 1 & 0 \\ 0 & 0 \end{bmatrix} \quad (48)$$

$$A_1 = \begin{bmatrix} 0 & 1 \\ 0 & 0 \end{bmatrix} \quad (49)$$

$$B_0 = \begin{bmatrix} 0 & 0 \\ 0 & 1 \end{bmatrix} \quad (50)$$

$$B_1 = \begin{bmatrix} 0 & 0 \\ -1 & 0 \end{bmatrix} \quad (51)$$

Let us define $\tilde{s}_{g,i} := [\tilde{s}_{g,i,0}, \ldots, \tilde{s}_{g,i,L}]^T$. In order to perform ST component coding, $O_{N_t}$ is used to form matrix pairs $\{A_i, B_i\}_{i=0}^{N_s-1}$, and then construct $X_g$ (l) as given in equation (52). Equation (52) is a GCOD in variables $\tilde{s}_{g,i,l}$, $i=0,\ldots,N_s-1$. From equation (52) it is deduced that $N_x = N_d$. Thus, the code rate for GSTFB coding is given in equation (53). At each block transmission interval i, the blocks $\tilde{s}_{0,0}$ and $\tilde{s}_{0,1}$, for example, are forwarded to the first and second transmit antenna 46A and 46B of transmitter 32, respectively. Each transmitted block from one antenna at time slot $2i+1$ is a conjugated and permuted version of the corresponding transmitted block from the other antenna at time slot $2i$ (with a possible sign change). According to equation (43) R<1 if $N_t>2$, which implies that the design induces a loss in bandwidth efficiency if more than two transmit antennas are used.

$$X_g^T(l) = \sum_{i=0}^{N_s-1} (A_i \tilde{s}_{g,i,l} + B_i \tilde{s}_{g,i,l}^*) \quad (52)$$

$$R = \frac{N_s}{N_d} \quad (53)$$

With $\Theta := [\Theta_0, \ldots, \Theta_L]^T$ denoting constellation precoder 34, $\tilde{s}_{g,i,l} = \tilde{s}_{g,i}$, where $\Theta_l^T \in C^{1 \times (L+1)}$ is the l th row of $\Theta$. Recalling that $_g^T$ is a GCOD by construction, equation (42) can be used to rewrite equation (40) as equation (54) below where the meaning of $s'_{g,i} = s_{g,i}$ is clear from the PEP analysis.

$$\Lambda_e(l) = \alpha \left[ \sum_{i=0}^{N_s-1} |\theta_l^T(s_{g,i} - s'_{g,i})|^2 \right] I_{N_t} \quad (54)$$

Because the first design criteria is satisfied if the second design criteria is satisfied, only the second design criteria is considered. Substituting equation (54) into the second design criteria yields equation (55). Using the arithmetic-geometric mean inequality, equation (55) can be lower bounded by equation (56) where the equality is satisfied when $|\Theta_l^T(s_{g,i}-s'_{g,i})|^2 = |\Theta_l^T(s_{g,i}-s'_{g,i})|^2$. Thus, according to the second design criteria, it is meaningful to maximize only the lower bound in equation (54) for all possible $s_g \neq s'_g$.

$$\xi(s_g, s'_g) := \prod_{l=0}^L det[\Lambda_e(l)] = \alpha^{N_t} \prod_{l=0}^L \left[ \sum_{i=0}^{N_s-1} |\theta_l^T(s_{g,i} - s'_{g,i})|^2 \right]^{N_t} \quad (55)$$

$$\xi(s_g, s'_g) \geq \alpha^{N_t} N_s^{N_t} \prod_{l=0}^L \prod_{i=0}^{N_s-1} |\theta_l^T(s_{g,i} - s'_{g,i})|^{N_t/N_s} \quad (56)$$

Because the lower bound is attained when $|\Theta_l^T(s_{g,i}-s'_{g,i})|^2$s are equal for different i s, $\bar{s}$ is used to denote a generic $s'_{g,i}$. From the second design criteria, the design criterion for $\Theta$, referred to as the "product distance criterion" is reduced to equation (57).

$$\min_{\forall \bar{s} \neq \bar{s}'} \prod_{l=0}^L |\theta_l^T(\bar{s} - \bar{s}')| \quad (57)$$

Equation (57) has been used to construct constellation precoders for flat fading channels. For example, using the precoders designed in Z. Wang and G. B. Giannakis, "Space-time diversity systems based on linear constellation preceding," IEEE Transactions on Wireless Communications, Vol. 2, No. 2, March 2003, when L=1, 3 and quadrature phase-shift keying (QPSK) is employed, the precoders $\Theta$ are given, respectively, by equations (58, 59).

$$\theta = \frac{1}{\sqrt{2}} \begin{bmatrix} 1 & e^{j(\pi/4)} \\ 1 & e^{j(5\pi/4)} \end{bmatrix} \quad (58)$$

$$\theta = \frac{1}{2} \begin{bmatrix} 1 & e^{j(\pi/8)} & e^{j(2\pi/8)} & e^{j(3\pi/8)} \\ 1 & e^{j(5\pi/8)} & e^{j(10\pi/8)} & e^{j(15\pi/8)} \\ 1 & e^{j(9\pi/8)} & e^{j(18\pi/8)} & e^{j(27\pi/8)} \\ 1 & e^{j(13\pi/8)} & e^{j(26\pi/8)} & e^{j(39\pi/8)} \end{bmatrix} \quad (59)$$

It is important to note that $\Theta$ is square, and thus nonredundant, and its constellation specific design depends on the finiteness of $A_s$.

To summarize, five steps may be used to design GSTFB codes and are given below.

1.) Choose $N_g$ and $N_c = N_g(L+1)$ for given $N_t$, $N_r$, and L.
2.) Determine $N_s$, and $N_d$ according to equation (43).
3.) Choose $\bar{N}$, $N_x = N_d$ and $\bar{N}_f = N_g N_f$.
4.) Design the (L+1)×(L+1) constellation precoder $\Theta$.
5.) Construct GSTFB codewords according to equation (52).

For example, FIG. 3 illustrates transmitter 32 with $N_f=2$ and $N_g=2$ where the $N_c \times (L+1)$ matrices $\{\Phi_g\}_{g=0}^{N_g-1}$ represents subcarrier selectors 40A and 40B (collectively "subcarrier selectors 40") that are used to assign L+1 subcarriers to each GSTF subsystem according to the subcarrier grouping scheme described previously. Denoting $_{(N_g l+g)} \in C^{N_c \times 1}$ as the $(N_g l+g+1)$ st column of the $N_c \times N_c$ identity matrix $I_{N_c}$. Mathematically, $\Phi_g$ is given by equation (60).

$$\Phi_g = [e(g,0), e(g,1), \ldots, e(g,L)] \quad (60)$$

The encoded GSTF information blocks are added together using summers 42 and OFDM modulator 44A and 44B form multi-carrier output waveforms in accordance with the outbound data stream. Transmit antennas 46A and 46B transmit the multi-carrier output waveforms formed by OFDM modulators 44A and 44B through wireless channel 48, respectively.

Following the reverse order of the encoding process, we perform the decoding starting with ST component decoder 52 to obtain decision statistics of $\tilde{s}_{g,i}$ from which $s_{g,i}$ is recovered by ML decoder 54. Parallel to serial (P/S) unit 56 then parses the information blocks into a stream of serial information symbols. Alternately, ST component decoding may also be performed by the lower complexity sphere decoding algorithm described in M. O. Damen, A. Chkeif, and J. C. Belfiore, "Lattice code decoder for space-time codes," IEEE Communications Letters, Vol. 4, pp. 161-163, May 2000 and E. Viterbo and J. Boutros, "A universal lattice code decoder for fading channels," IEEE Transactions on Information Theory, Vol. 45, pp. 1639-1642, July 1999, which is incorporated herein by reference. Decoding the received transmissions relies on exploiting the separability of GSTF transmission in the frequency dimension.

Combining equation (25) with equation (52) yields equation (61) where $W_g^T(l)50$ is additive noise experienced during transmission through channel 48 which is described in detail previously. In order to decode $\tilde{s}_{g,i,l}$ we further define $_{l,i,v}$ as given in equation (62) where, $[A_i]_\mu$ and $[B_i]_\mu$ denote the $\mu$ th columns of $A_i$ and $B_i$, respectively.

$$Y_g^T(l) = \left[\sum_{i=0}^{N_s-1}(A_i\tilde{s}_{g,i,l} + B_i\tilde{s}_{g,i,l}^*)\right]H_g^T(l) + W_g^T(l) \tag{61}$$

$$\phi_{\ell,i,v}^T := \left[\sum_{\mu=1}^{N_t}[A_i]_\mu^T H_{v\mu}^*(N_g\ell + g)\right] \times \sum_{\mu=1}^{N_t}[B_i]_\mu^T H_{v\mu}(N_g\ell + g)\right] \tag{62}$$

Based on equation (61), the soft decision statistics of $\tilde{s}_{g,i,l}$ can be formed as given in equation (62) with $y_{l,v}$ denoting the $v^{th}$ column of $Y_g^T$ (l). Using equation (42), direct substitution verifies that in the absence of noise equation (63) yields equation (64).

$$\hat{\tilde{s}}_{g,i,\ell} = \sum_{v=1}^{N_r} \varphi_{\ell,i,v}^T \begin{bmatrix} y_{\ell,v} \\ y_{\ell,v}^* \end{bmatrix} \tag{63}$$

$$\hat{\tilde{s}}_{g,i,\ell} = \alpha \sum_{v=1}^{N_r}\sum_{\mu=1}^{N_t} |H_{v\mu}(N_g\ell + g)|^2 \tilde{s}_{g,i,\ell} \tag{64}$$

After obtaining $\hat{\tilde{s}}_{g,i} := [\hat{\tilde{s}}_{g,i,0}, \ldots, \hat{\tilde{s}}_{g,i,L}]^T$, ML decoding of $s_{g,i}$ is performed using the sphere decoding algorithm. The complexity of the sphere decoding algorithm is independent of the constellation size and polynomial in L+1. Additionally, because L is small relative to $N_c$, the decoding complexity of GSTFB codes is low.

Alternately, STF trellis codes can be designed by applying multiple trellis coded modulation (M-TCM) which has been used for developing ST trellis codes in V. Tarokh, N. Seshadri, and A. R. Calderbank, "Space-time codes for high data rate wireless communication: performance criterion and code construction," IEEE Transactions on Information Theory, Vol. 44, pp. 744-765, March 1998, the entire contents being incorporated herein by reference. In order to enable the application of M-TCM, a link between the described STF system and the conventional ST system is made.

The so-called "smart-greedy" ST trellis codes have already been designed to achieve acceptable performance for both flat-fading and time-varying channels. However, unlike the paper above, the time varying channel $H_t$ herein is artificially created and its time variations are well structured. Therefore, "smart" ST codes need not be designed; instead, ST codes need only be "greedy" in order to take advantage of time selectivity. Consequently, the two design criteria are sufficient.

Recalling that equation (19) represents 3-D GSTF codes $X_g$ as a set of 2-D codes, it is implicitly suggested that the transmission of $X_g$ can be thought of as being carried out in a an equivalent 2-D "space-virtual-time" (SVT) system with $N_t$ transmit antennas and $N_r$ receive antennas, where the virtual-time dimension corresponds to the joint dimensions of time and frequency in a manner described in detail below.

First, define $x_t := [x_t^1, \ldots, x_t^{N_t}]^T$ as the symbol block transmitted by $N_t$ transmit antennas during the $t^{th}$ virtual time interval and $y_t := [y_t^1, \ldots, y_t^{N_r}]^T \in C^{N_r \times 1}$ as the corresponding block of received samples. Equation (65) models the SVT system where $N_r \times N_t$ is the MIMO channel matrix, and $N_r \times 1$ is the noise vector. Equations (66, 67) are defined to link the SVT system to the GSTF system and equations (68-71) specify $y_t$, $x_t$, $w_t$, and $H_t$ respectively. The index functions and in equations (67-69) and equation (70) respectively are given by equations (71, 72) with $\lfloor \bullet \rfloor$ denoting the integer floor.

$$y_t = H_t x_t + w_t, \, t=0, \ldots, N_x(L+1) \tag{65}$$

$$Y_g := \lfloor Y_g(0), \ldots, Y_g(L)\rfloor \tag{66}$$

$$W_g := \lfloor W_g(0), \ldots, W_g(L)\rfloor \tag{67}$$

$$y_t := \lfloor Y_g \rfloor_{\varsigma(t)} \tag{68}$$

$$\chi_t := \lfloor X_g \rfloor_{\varsigma(t)} \tag{69}$$

$$w_t := \lfloor W_g \rfloor_{\varsigma(t)} \tag{69}$$

$$H_t := H_g(\tau(t)) \tag{70}$$

$$\varsigma(t) := N_x I - \left\lfloor \frac{t}{L+1} \right\rfloor(N_x L + N_x - 1) + 1 \tag{71}$$

$$\tau(t) := t - \left\lfloor \frac{t}{L+1} \right\rfloor (L+1) \tag{72}$$

Except for the difference in ordering of transmissions, the model in equation (65) is mathematically equivalent to the model in equation (21). In modeling the described STF system as an SVT system, the property that STF transmissions are separable in both frequency and time but not in space has been exploited.

Although the underlying fading channels are time-invariant, $H_t$ varies with virtual-time due to the fact each GSTF codeword is transmitted over different subcarriers. Therefore, equation (65) can be thought of as an ST system transmitting over time-selective, but frequency-flat, fading channels. This provides an explicit link between each GSTF subsystem and the well-developed ST system. Furthermore, equation (65) implies that due to the presence of time diversity (or, more precisely, virtual-time diversity) the SVT (or STF) system can achieve a diversity advantage greater than $N_t N_r$ and it is possible to take advantage of existing ST coding techniques in designing GSTFT codes.

Based on equation (65), the design of STFT codes is equivalent to building a trellis to generate $x_t$ s continuously. It is important to note the following property of STFT codes before pursuing the design of STFT codes.

Theorem 1: Suppose that each transmitted symbol $x_t^\mu$ belongs to the constellation set $A_t$ with $|A_t|^2 = 2^b$ elements. If the maximum diversity advantage $G_d^{max}=N_tN_r(L+1)$ is achieved, then the transmission rate is at most $R_t^{max}=\log_2|A_t|/(L+1)=b/(L+1)$ bits/s/Hz. Because $R_t^{max}$ is related to R by $R_t^{max}=R \log_2|A_s|$, Theorem 1 implicitly suggests two possible design strategies which are described below.

Strategy 1: Design an STF trellis code with rate R=1, where the trellis outputs a single block $x_t$ corresponding to each information symbol $s_t$ and has cardinality $|A_t|=|A_s|^{(L+1)}$.

Strategy 2: Design an STF trellis code with code rate R=1/(L+1), where the trellis outputs L+1 blocks $x_t$ corresponding to each information symbol $s_t$ and has cardinality $|A_s|=|A_t|$.

These two design strategies are equivalent in the sense that the resulting codes achieve the same transmission rate $R_t^{max}$. Moreover, both strategies expand either the constellation of the transmitted symbols or that of the information symbols. However, the implementation of the two strategies is drastically different. According to the first strategy, it is desirable to select a trellis involving constellation expansion, which is not the case for most existing ST trellis codes. However, because the goal is to take advantage of existing techniques for ST trellis codes, the STF trellis codes constructed below use the second strategy.

An ST trellis encoder with R=1 with $T_{ST}(●)$, and cardinality $|A_s|=|A_t|=2^{R_t^{max}(L+1)}$ could be used as the ST component coder 38 in FIG. 3. According to the second strategy, the STF trellis encoder with R=1/(L+1) is constructed from $T_{ST}(●)$ by repeating its output L+1 times. In other words, going back to each GSTF subsystem, transmissions are repeated over L+1 subcarriers. Therefore, the design of STFT trellis codes is reduced to designing conventional trellis codes with repeated transmissions. A similar approach was also taken in designing the "smart-greedy" ST trellis codes. For example, when $N_t=2$, L=1, and $R_t=2$ bits/s/Hz, the ST trellis code depicted in FIG. 19 of the cited paper can be used to generate STFT codes.

Because GSTF trellis codes are generated by a trellis, decoding can be efficiently implemented by using Viterbi decoding which may be used in place of ML decoder 54 in FIG. 3. According to equation (65), the branch metric for $x_t$ is given by equation (74) where $[H_t]_{v\mu}$ denotes the (v,μ) th element of $H_t$. Similar to ST trellis codes, the decoding complexity of GSTF trellis codes is exponential in the number of trellis states and the transmission rate.

$$\sum_{v=1}^{N_r}\left|y_t^v - \sum_{\mu=1}^{N_i}[H_t]_{v\mu}x_t^\mu\right|^2 \quad (74)$$

Both STF block and trellis codes may be used in accordance with the described invention. However, before comparing simulation for testing the performance of STF block and trellis codes, several issues relevant to their performance and implementation are described. The issues examined here are as follows:

1.) How much diversity advantage is sufficient?
2.) Is it more advantageous to use STF block or STF trellis coding?

As mentioned previously, the primary goal of the described invention is to improve the diversity advantage from order $N_tN_r$ (in an ST coded system) to order $G_d^{max}=N_tN_r(L+1)$ by additionally exploiting multipath diversity. However, performance improvement by increasing $G_d^{max}$ will eventually saturate as the diversity order grows beyond a certain threshold. Hence, STF coding may be preferred when dealing with systems having a small number of antennas. A small number of antennas is commercially preferable because of cost. In particular, minimal multi-antenna systems with $N_t=2$ and $N_r=1$ are desirable for downlink applications. When $N_r=1$, little is gained by using more than $N_t=4$ transmit antennas in an ST coded system. Therefore, L+1 should provide sufficient diversity advantage in the described STF system with $N_t=2$ and $N_r=1$. Such a system may be desirable because the smaller the value for L, the lower the decoding complexity for both STFB and STFT codes.

Thus far, L has been restricted to the physical channel order. This restriction is lifted by allowing $L_{real}$ to denote the physical channel order and L to represent the channel order assumed in designing STF codes. As a result, L can be generally different from $L_{real}$. In typical wireless environments, $L_{real}>2$. In order to minimize decoding complexity, L can be chosen such that $L \leq L_{real}$ and STF codes can be designed as previously described. If $L \leq L_{real}$, the resulting system can achieve a diversity advantage of order $N_tN_r(L+1)$ as well as a high coding advantage. Consequently, the achieved performance may be sub-optimal in this case, but it may be sufficiently good for most practical applications.

Although the described design of STF block and STF trellis codes applies to arbitrary $N_t$ and $N_r$, the minimal multi-antenna system with $N_t=2$ and $N_r=1$ is used when comparing the two codes. Recall that with $N_t=2$ there is no rate loss when using STF block coding.

One advantage of STF blocks codes over STF trellis codes is the low decoding complexity of STF block codes. More importantly, the decoding complexity of STF block codes is independent of the transmission rate, which is not the case for STF trellis codes. In addition, the construction of STF block codes is easier than that of STF trellis codes. On the other hand, STF trellis coding operates in a similar way as conventional channel coding. Therefore, STF trellis codes can more easily by incorporated into existing communication systems. For example, an ST trellis coder can be directly applied to STF trellis codes.

Figure 4:
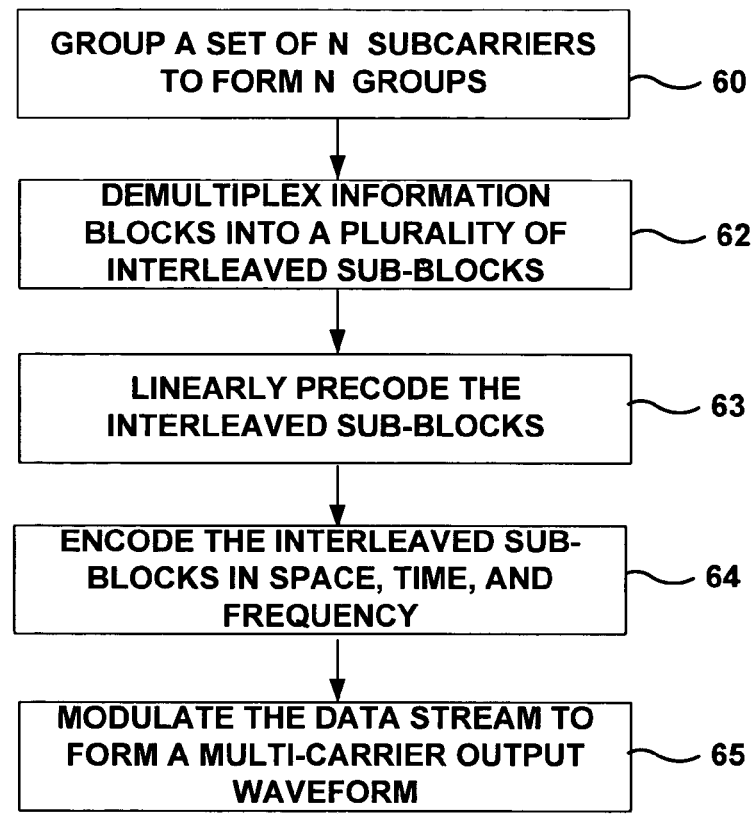
FIG. 4 is a flow chart illustrating an example mode of operation of a communication system in which a transmitter and a receiver communicate using STF coding techniques in accordance with the principles of the invention.
Figure 4:
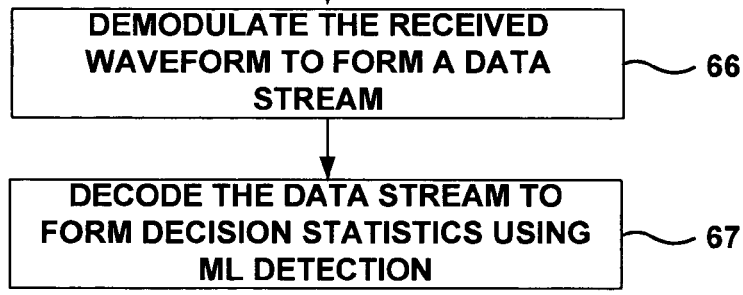

FIG. 4 is a flowchart illustrating an example mode of operation of communication system 2 of FIG. 1 in which transmitter 4 and receiver 8 communicate using the described STF coding techniques. Generally, transmitter 4 forms $N_g$ groups of subcarriers from a set of $N_c$ subcarriers (step 60). As described previously, the number of subcarriers may be selected to be an integer multiple of the channel length. Forming $N_g$ groups generates GSTF codewords according to equation (23) and also generates GSTF subsystems according to equation (24).

Next, transmitter 4 applies codes to the $N_g$ groups of subcarriers, thereby performing STF coding within each GSTF subsystem, as described previously. In other words STF coding generates $X_g$s individually rather than generating X as whole, thereby achieving efficiencies. Transmitter 4 may apply STFB codes or STFT codes, as previously described, to each of the GSTF subsystems. During this process, a data stream of information blocks are demultiplexed into a plurality of interleaved sub-blocks (step 62) and linearly precoded (step 63) before application of the codes (step 64). In this manner, the data stream produces an outbound data stream that is jointly encoded in space, time, and frequency (step 64). The encoded outbound data stream is modulated to form a multi-carrier output waveform (step 65) and transmitted by $N_t$ antennas through communication channel 12 to receiver 8. The multi-carrier output waveform has diversity that is multiplicative in number of transmit antennas; receive antennas, and the length of the wireless channel.

Receiver 8 demodulates the incoming multi-carrier waveform via $N_r$ receive antennas to form a received data stream (step 66). ML decoder 54 decodes the sub-blocks of the data stream to form decision statistics (step 67) as described previously. Receiver 8 may employ sphere decoding or Viterbi decoding when STFB codes or STFT codes are applied respectively. As a result, wireless communication system 2 achieves maximum diversity and high coding gains, while also having lower decoding complexity than well known ST and SF coding techniques.

FIGS. 5-8 are graphs that present simulations of GSTF block and GSTF trellis coding techniques and comparisons with existing SF and ST codes. In all simulations, a minimum multi-antenna OFDM system with $N_t=2$ and $N_r=1$ is used and performance is measured with OFDM symbol error rate (OFDM-SER) which is averaged over 100,000 channel realizations. Additionally, the transmission rate is fixed at $R_t=2$ bps/Hz for all simulations.

The random channels were generated according to two different channel models, a multiray channel model and a HIPERLAN 2 channel model. The multiray channel model corresponds to channel taps that are i.i.d., zero mean, complex Gaussian with variance $1/(2L_{real}+2)$ per dimension. The HIPERLAN 2 random channel models are based on the HIPERLAN 2 channel model A, which corresponds to a typical office environment. Each channel tap in the profile of channel model A is characterized by the Jakes' Doppler spectrum with a mobile speed at 3 m/s. In all simulations a distinction is made between L and $L_{real}$ as described previously.

Figure 5:
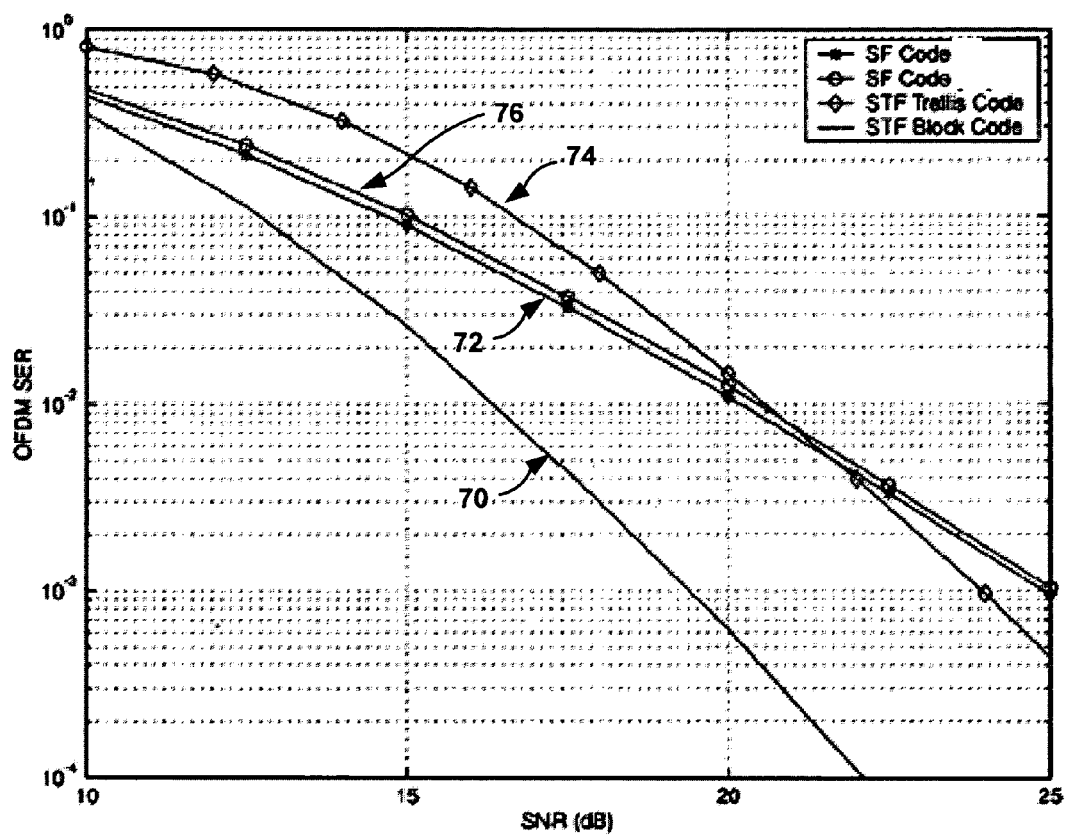
FIGS. 5-8 are graphs illustrating modeled performance estimates of the STF coding techniques described herein.

FIG. 5 is a graph comparing GSTF block 70 and GSTF trellis 72 codes to the SF coding schemes (74, 76) described in H. Bölcskei and A. Paulraj, "Space-frequency coded broadband OFDM systems," in IEEE Wireless Communications Networking Conference, Chicago, Ill., Sep. 23-28, 2000, pp. 1-6 and B. Lu and X. Wang, "Space-time code design in OFDM systems," in Proceedings on Global Telecommunications Conference, Vol. 2, San Francisco, Calif., Nov.-Dec. 27-1, 2000, pp. 1000-1004, respectively, thee entire contents of both papers being incorporated herein by reference. The design of both GSTF block 70 and trellis 72 codes is based on L=1, which could be different from $L_{real}$. QPSK modulation ($|A_s|=4$) is chosen for GSTF block 70 coding and for the two SF coding schemes (74, 76), whereas 16-QAM ($|A_s|=16$) is selected for GSTF trellis coding 72. As a result, the transmission rate for all four coding schemes is $R_t=2$ bps/Hz. GSTF trellis code 72 is constructed using the described techniques in conjunction with the ST trellis code in FIG. 19 of the previously referenced paper entitled "Space-time codes for high data rate wireless communication: performance criterion and code construction." The 16-state TCM code with effective length 3 and the 16-state ST trellis code of FIG. 5 of the same reference are used to generate SF codes (74, 76) respectively. All simulations are carried out with the number of subcarriers $N_c=64$ and with multiray100 channels having $L_{real}=1$.

Both GSTF block 70 and GSTF trellis 72 codes are able to achieve higher diversity gain than the SF codes (74, 76). While GSTF block code 70 outperforms SF codes (74, 76) for all SNR values, GSTF trellis code 72 outperforms SF codes (74, 76) only when the SNR value is greater than 20 dB. The latter implies that GSTF trellis code 72 has lower coding gain, which is due to the fact that the chosen ST trellis code upon which it is based is not optimal in terms of coding gain. Performance improvement can be expected by maximizing both diversity and coding gains for GSTF trellis codes 72 (as in GSTF block codes 70), which usually involves high-complexity computer search.

Figure 6:
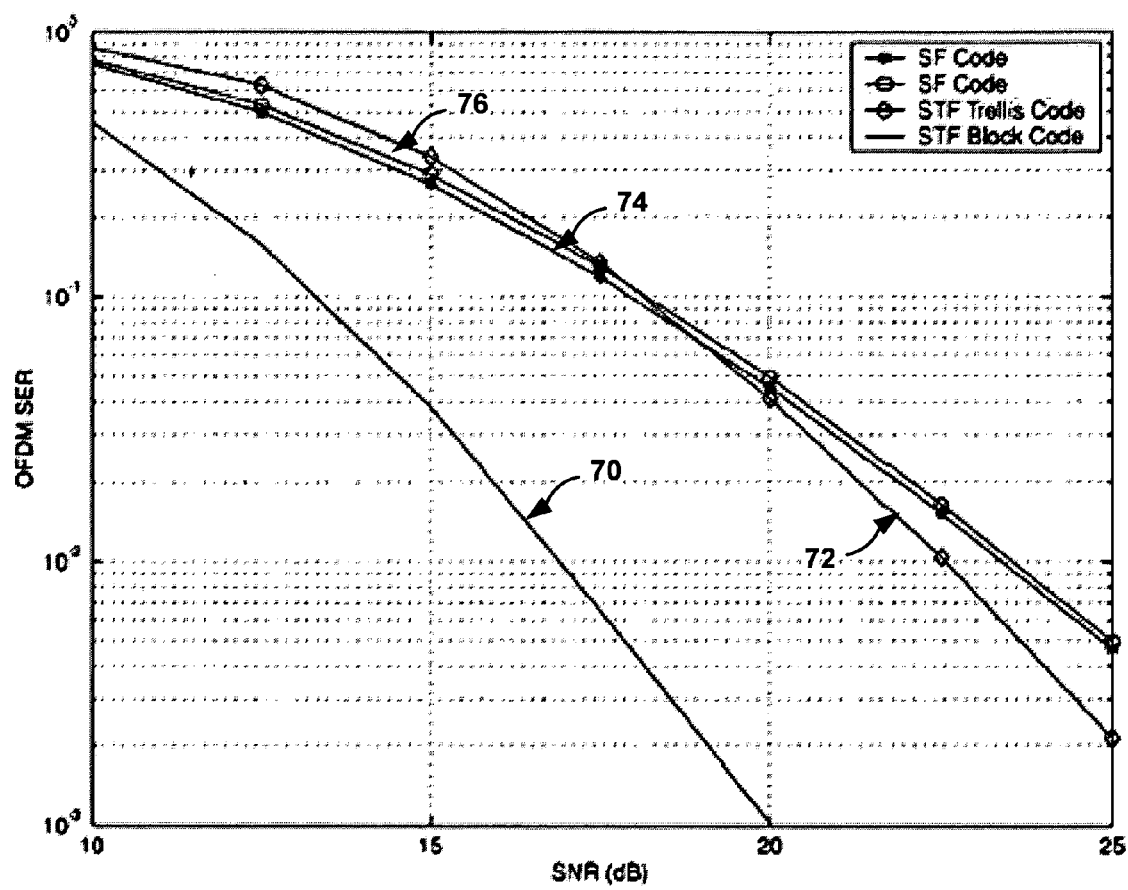

FIG. 6 is a graph using the same codes as FIG. 5 but with simulations using HIPERLAN 2 channels with $L_{real}=8$. Both GSTF block 70 and GSTF trellis codes 72 have higher diversity gains than SF codes (74, 76). The performance of GSTF trellis codes 72 is close to that of SF codes (74, 76) even for low SNR values. It should be noted that GSTF block 70 and GSTF trellis 72 codes are designed regardless of the real channel order $L_{real}=8$, channel correlation, and power profile in HIPERLAN 2 channels, which speaks for the robustness of the GSTF coding design.

Figure 7:
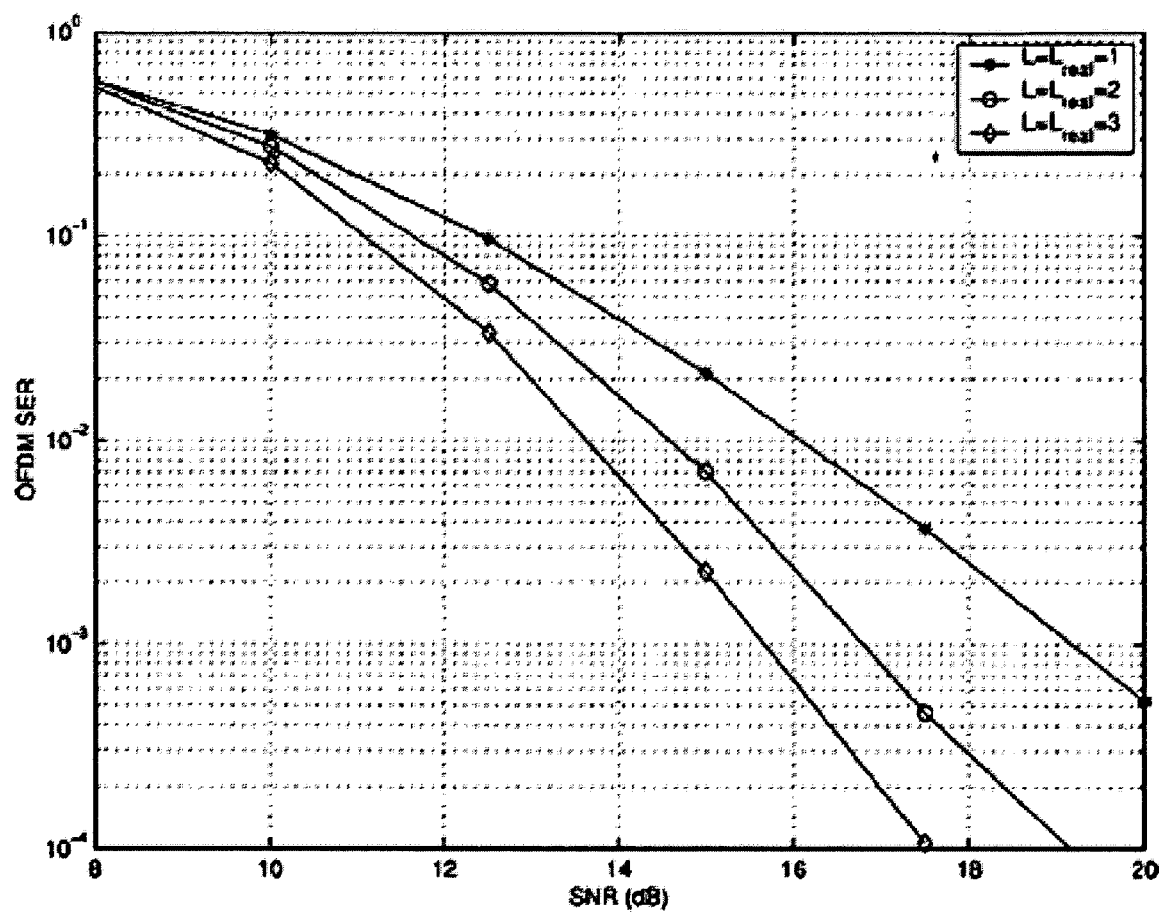

FIG. 7 is a graph simulating the performance of GSTF block coding in the presence of multi-ray channels with varying channel orders, $L_{real}=1,2,3$. FIG. 7 illustrates the performance improvement with multipath diversity. Assuming perfect knowledge of $L_{real}$, the GSTF block codes are designed with $L=L_{real}$. The number of subcarriers is chosen as $N_c=48$. The GSTF codes clearly achieve higher diversity gains as the channel order increases, which justifies the importance of GSTF coding that accounts for multipath diversity.

Figure 8:
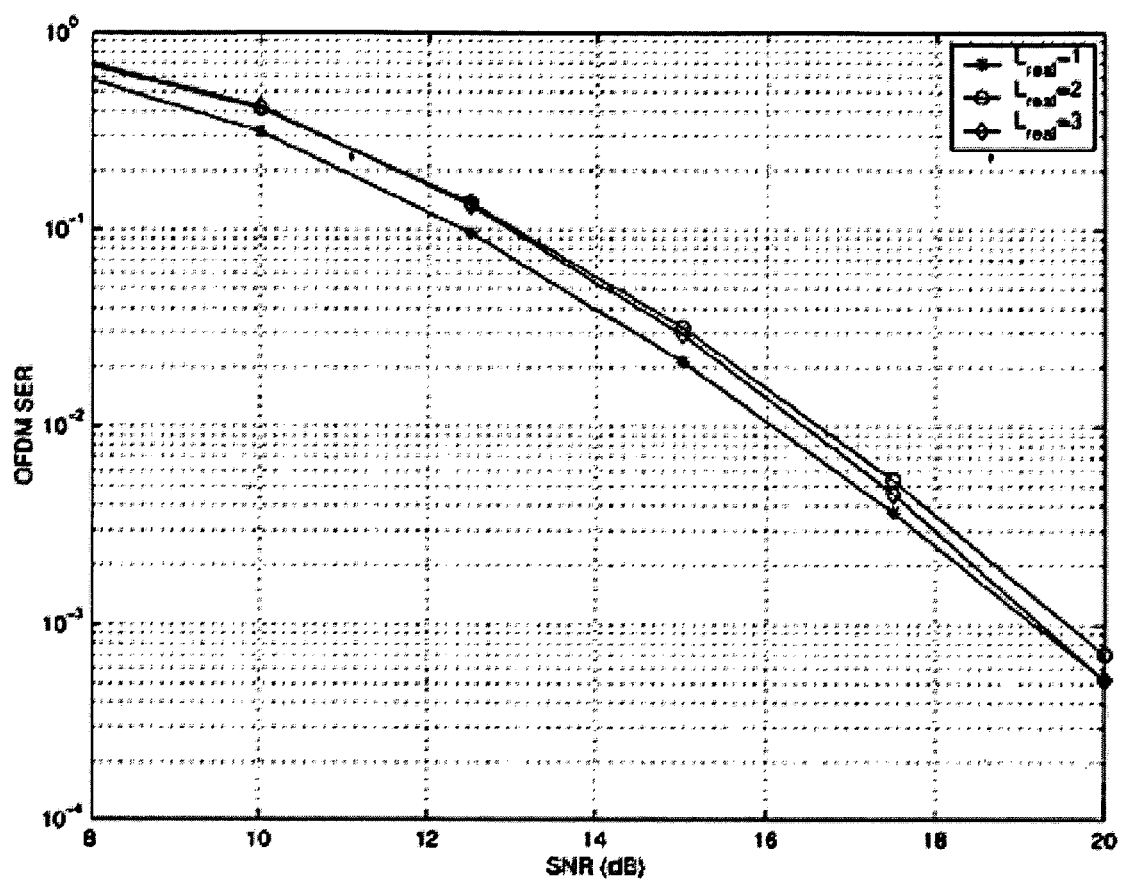

FIG. 8 is a graph illustrating the performance of GSTF block codes when the channel order is underestimated, i.e. the GSTF block code is designed for L=1 while its performance is simulated when $L_{real}=1,2,3$. Multiray channels are used in simulation and the number of subcarriers is selected to be $N_c=48$. The SER performance curves with different $L_{real}$ values are relatively close. Therefore, using the results of FIG. 7 it is concluded that when maximum diversity gain is a goal, GSTF codes should be designed with L chosen as the upper bound of all possible $L_{real}$ values.

Various embodiments of the invention have been described. The described techniques can be embodied in a variety of receivers and transmitters including base stations, cell phones, laptop computers, handheld computing devices, personal digital assistants (PDA's), and the like. The devices may include a digital signal processor (DSP), field programmable gate array (FPGA), application specific integrated circuit (ASIC) or similar hardware, firmware and/or software for implementing the techniques. If implemented in software, a computer readable medium may store computer readable instructions, i.e., program code, that can be executed by a processor or DSP to carry out one of more of the techniques described above. For example, the computer readable medium may comprise random access memory (RAM), read-only memory (ROM), non-volatile random access memory (NVRAM), electrically erasable programmable read-only memory (EEPROM), flash memory, or the like. The computer readable medium may comprise computer-readable instructions that when executed in a wireless communication device, cause the wireless communication device to carry out one or more of the techniques described herein. These and other embodiments are within the scope of the following claims.

The invention claimed is:

1. A wireless communication device comprising:
   a plurality of antennas to transmit a multi-carrier waveform, wherein each antenna outputs a plurality of orthogonal frequency-division multiplexing (OFDM) subcarriers;
   a subcarrier selector to divide the OFDM subcarriers into two or more groups of subcarriers, wherein the subcarriers for at least one of the antennas are divided between at least two of the groups of subcarriers; and
   an encoder that applies a set of codes to each of groups of the groups of subcarriers to jointly encode a data stream in space, time, and frequency, and produce an outbound data stream for transmission through a wireless communication channel by the antennas.

2. The wireless communication device of claim 1, wherein the number of subcarriers is an integer multiple of a length of the wireless communication channel.

3. The wireless communication device of claim 1, wherein the number of subcarriers is selected as a function of a length L of the communication channel.

4. The wireless communication device of claim 3, wherein the number of subcarriers is selected in accordance with the following equation:

$$N_c=N_g(L+1)$$

where $N_c$ is the number of subcarriers per each of the antennas, $N_g$ is the number of groups into which the subcarriers are divided, and L +1 is the length of the wireless channel.

5. The wireless communication device of claim 1, wherein the outbound data stream comprises STF codewords having encoded symbols, and the subcarrier selector divides the subcarriers into the two or more groups so the encoded symbols of each of the STF codewords are allocated across the groups of subcarriers.

6. The wireless communication device of claim 5, wherein the subcarrier selector divides each of the STF codewords X into respective $N_g$ group space-time-frequency codewords $X_g$ in accordance with the following equation:

$$X_g=[X_g(0),X_g(1),\ldots,X_g(L)]X_2(l)=X(N_gl+g),$$
$$g=0,\ldots,N_g-1$$

where l represents the column vectors of the matrix representing Group Space Time Frequency (GSTF) codeword $X_g$ and g represents the number of groups of subcarriers.

7. The wireless communication device of claim 1, wherein the codes take the form of block codes or trellis codes.

8. The wireless communication device of claim 1, further comprising a modulator to produce a multi-carrier output waveform in accordance with the outbound data stream for transmission through the wireless channel.

9. The wireless communication device of claim 1, further comprising:
   a demultiplexer that receives the data stream and outputs a plurality of interleaved data streams; and
   a set of linear precoders that linearly precodes the interleaved data streams to produce precoder data streams for processing by the encoder.

10. The wireless communication device of claim 9, wherein the encoder comprises a plurality of space-time-frequency (STF) encoders.

11. The wireless communication device of claim 10,
   wherein the plurality of STE encoders output a plurality of encoded data streams, and
   wherein the wireless communication device further comprises a summer to sum the encoded data streams and produce the encoded output data stream.

12. The wireless communication device of claim 9, wherein the linear precoders apply unitary matrices to blocks of symbols of the interleaved data streams.

13. The wireless communication device of claim 1, wherein the multi-carrier waveform has a diversity that is multiplicative in the number of antennas and a length of the wireless channel.

14. The wireless communication device of claim 1, wherein the wireless communication device comprises one of a base station and a mobile device.

15. The wireless communication device of claim 1,
   wherein the subcarrier selector and the encoder comprise executable instructions, and
   wherein the wireless communication device comprises a digital signal processor to execute the instructions.

16. A method comprising: grouping a set of orthogonal frequency-division multiplexing (OFDM) subcarriers into two or more groups of subcarriers;
   applying a unique codes to each of the groups of subcarriers to jointly encode a data stream in space time, and frequency and produce an outbound data stream; and
   transmitting an OFDM waveform through a wireless communication channel in accordance with the outbound data stream using a plurality of transmit antennas, where each of the transmit antennas outputs OFDM subcarriers selected from the two or more groups of subcarriers.

17. The method of claim 16, further comprising selecting the number of subcarriers in the set of subcarriers as an integer multiple of a length of the wireless communication channel.

18. The method of claim 17, further comprising selecting the number of subcarriers in the set of subcarriers as an integer multiple of the channel length in accordance with the following equation:

$$N_c=N_g(L+1)$$

where $N_c$ is the number of subcarriers in the set of subcarriers, $N_g$ is the number of groups into which the set of subcarriers is divided, and L +1 is the length of the wireless channel.

19. The method of clam 16, wherein the outbound data stream comprises space-time-frequency (STF) codewords having encoded symbols, and grouping the subcarriers comprises grouping the subcarriers into the two or more groups so the encoded symbols of each of the STF codewords are allocated across the groups of subcarriers.

20. The method of claim 19, wherein grouping the set of subcarriers into two or more groups comprises dividing each of the STF codewords X into respective $N_g$ group space-time-frequency codewords $X_g$ in accordance with the following equation:

$$X_g=[X_g(0),X_g(1),\ldots,X_g(L)]X_g(l)=X(N_gl+g),$$
$$g=0,\ldots,N_g-1$$

where $X_g(l)$ represents the column vectors of the matrix representing group STF (GSTF) codeword $X_g$, and g represents the number of groups of subcarriers.

21. The method of claim 20, further comprising designing the set of all possible $X_g$s, $A_{x,g}$, such that $\forall X_g \neq X'_g \in A_{x,g}$, matrices in the following equation have full rank:

$$\Lambda_e(l)=[X_g(l)-X'_g(l)][X_g(l)-X'_g(l)]^H, \forall l \in [0,L]$$

and such that $\forall X_g \neq X'_g \in A_{x,g}$, the following equation is maximized:

$$\prod_{l=0}^{L} \det[\Lambda_e(l)],$$

where $\Lambda_e(l)$ represents a sum of ranks of matrices $X_g(l)$ and $X'_g(l)$.

22. The method of claim 16, wherein the codes take the form of block codes or trellis codes.

23. The method of claim 16, further comprising modulating the outbound data stream to produce the OFDM waveform far transmission through the wireless channel.

24. The method of claim 16, further comprising:
   demultiplexing the data stream into a plurality of interleaved data streams;
   linearly precoding the plurality of interleaved data streams to produce precoded data streams; and
   applying the codes to the precoded data streams in accordance with the selected subcarrier groups.

25. The method claim 24, wherein linearly precoding comprises applying unitary matrices to blocks of symbols of the interleaved data streams.

26. A computer-readable medium comprising instructions to cause a programmable processor to:
group a set of orthogonal frequency-division multiplexing (OFDM) subcarriers into two or more groups of subcarriers;
apply a unique set of codes to each of the groups of subcarriers to produce an outbound data stream jointly encoded in space. time and frequency; and
transmit an OFDM waveform from a plurality of transmit antennas in accordance with the outbound data stream, wherein each of the transmit antennas outputs OFDM subcarriers selected from the two or more groups of subcarriers.

27. A system comprising:
a transmitter that groups a set of orthogonal frequency-division multiplexing (OFDM) subcarriers into two or more groups of subcarriers, applies a unique codes to information blocks for each group of OFDM subcarriers to encode the information blocks of the subcarrier groups in space, time and frequency, sums the corresponding information blocks for subcarriers of each of a plurality of transmit antenna from the two or more groups, and outputs an OFDM waveform via the plurality of transmit antennas in accordance with the encoded subcarrier groups; and
a receiver that receives the OFDM waveform and produces a stream of estimated symbols.

* * * * *